(12) United States Patent
Tanaka et al.

(10) Patent No.: US 10,965,325 B2
(45) Date of Patent: Mar. 30, 2021

(54) COMMUNICATION UNIT

(71) Applicant: Murata Manufacturing Co., Ltd., Kyoto (JP)

(72) Inventors: Satoshi Tanaka, Kyoto (JP); Kazuo Watanabe, Kyoto (JP); Tetsuaki Adachi, Kyoto (JP); Masahito Numanami, Kyoto (JP); Yasuhisa Yamamoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/285,584

(22) Filed: Feb. 26, 2019

(65) Prior Publication Data

US 2019/0190547 A1 Jun. 20, 2019

Related U.S. Application Data

(62) Division of application No. 15/490,073, filed on Apr. 18, 2017, now Pat. No. 10,256,849.

(30) Foreign Application Priority Data

Apr. 19, 2016 (JP) .............................. JP2016-083714
Aug. 19, 2016 (JP) .............................. JP2016-161203
Jan. 6, 2017 (JP) .............................. JP2017-001320

(51) Int. Cl.
*H04B 1/00* (2006.01)
*H04L 25/02* (2006.01)
(Continued)

(52) U.S. Cl.
CPC ............. *H04B 1/005* (2013.01); *H04L 25/02* (2013.01); *H04W 72/0453* (2013.01); *H04W 88/06* (2013.01); *H04W 88/08* (2013.01)

(58) Field of Classification Search
CPC ...... H04B 1/005; H04B 1/0057; H04B 1/006; H04B 1/0096; H04B 1/408; H04B 1/406;
(Continued)

(56) References Cited

U.S. PATENT DOCUMENTS 5,014,067 A 5/1991 Chisholm
6,215,988 B1 * 4/2001 Matero .................. H04B 1/005
455/112

(Continued)

FOREIGN PATENT DOCUMENTS

JP 2000-049637 A 2/2000
JP 2007-143050 A 6/2007
JP 2010-171898 A 8/2010

OTHER PUBLICATIONS

WO2015161478 Huang et al, machine translated (Year: 2015).*
(Continued)

*Primary Examiner* — Jianxun Yang
(74) *Attorney, Agent, or Firm* — Pearne & Gordon LLP

(57) ABSTRACT

A communication unit includes the following elements. A first transmit circuit outputs a first signal or a second signal from a first input signal. A first amplifier amplifies the first signal and outputs a first amplified signal. A first signal generating circuit generates a third signal having a frequency higher than a frequency of the second signal, based on the second signal and a first reference signal. A first filter circuit receives the third signal and allows one of a frequency component representing a sum of the frequency of the second signal and a frequency of the first reference signal and a frequency component representing a difference therebetween to pass through the first filter circuit and attenuates the other one of the frequency components. A second amplifier amplifies the third signal output from the first filter circuit and outputs a second amplified signal.

10 Claims, 17 Drawing Sheets

(51) Int. Cl.
*H04W 72/04* (2009.01)
*H04W 88/06* (2009.01)
*H04W 88/08* (2009.01)

(58) Field of Classification Search
CPC .. H04L 25/02; H04W 72/0453; H04W 88/06; H04W 88/08
See application file for complete search history.

(56) References Cited

U.S. PATENT DOCUMENTS

| | | |
|---|---|---|
| 2003/0013482 A1 | 1/2003 | Brankovic |
| 2003/0193923 A1* | 10/2003 | Abdelgany ............ H04B 1/005 370/342 |
| 2006/0089115 A1 | 4/2006 | Goodman |
| 2006/0223487 A1 | 10/2006 | Alam et al. |
| 2007/0004371 A1* | 1/2007 | Okanobu ............... H04B 1/005 455/324 |
| 2009/0009408 A1* | 1/2009 | Rofougaran ........... H01L 23/66 343/702 |
| 2015/0172949 A1* | 6/2015 | Lee ...................... H04B 17/309 370/252 |
| 2015/0200690 A1 | 7/2015 | Youssef et al. |

OTHER PUBLICATIONS

Infineon Technologies AG, "Application Guide for Mobile Communication" Edition Jan. 20, 2017, p. 11, Document Reference AN_201701_PL55_000, Munich, Germany.

NTT DOCOMO, Inc., DOCOMO 5G White Paper—5G Radio Access: Requirement, Concept and Technologies, Jul. 2014.

The Fifth Generation Mobile Communications Promotion Forum, 5GMF White Paper—5G Mobile Communications Systems for 2020 and Beyond, Sep. 29, 2017, Version 1.1.

* cited by examiner

COMMUNICATION UNIT

This is a division of U.S. patent application Ser. No. 15/490,073 filed on Apr. 18, 2017, which claims priority from Japanese Patent Application No. 2017-001320 filed on Jan. 6, 2017, Japanese Patent Application No. 2016-161203 filed on Aug. 19, 2016, and Japanese Patent Application No. 2016-083714 filed on Apr. 19, 2016. The contents of these applications are incorporated herein by reference in their entireties.

BACKGROUND

The present disclosure relates to a communication unit. A mobile terminal using a communication network for cellular phones contains a communication unit that sends and receives radio frequency (RF) signals with a base station. Nowadays, for mobile terminals, communication units supporting multiple communication standards (multimode) and multiple frequency bands (multiband) are mainly used.

For example, "Application Guide for Mobile Communication" Infineon Technologies, pp 11 [searched on Mar. 29, 2016], the Internet <URL: http://www.infineon.com/dgdl/Infineon-App_Guide_Mobile_CommunicatioC-BC-v01_01-EN.pdf?fileId=db3a304334c41e910134f6522b346704> discloses a communication unit including a circuit supporting the second generation (2G) of wireless communication systems and a circuit supporting the third generation (3G) and the fourth generation (4G) of wireless communication systems.

BRIEF SUMMARY

As the next-generation communication standard for mobile terminals, the fifth generation (5G) of wireless communication systems is attracting a lot of attention, and demand for communication units supporting, not only 3G and 4G, but also 5G is increasing. In 5G, frequency bands (about 15 to 90 GHz, for example) higher than those in 3G and 4G will probably be used. If a circuit supporting 5G is designed in a similar manner to that of 3G and 4G, the circuit configuration becomes more complicated and more components are required.

The present disclosure has been made in view of this background. The present disclosure provides a communication unit that supports a new communication standard substantially without necessarily the need of additional components.

According to a preferred embodiment of the present disclosure, there is provided a communication unit including a first transmit circuit, first and second amplifiers, a first signal generating circuit, and a first filter circuit. The first transmit circuit outputs a first signal or a second signal from a first input signal. The first amplifier amplifies the first signal and outputs a first amplified signal. The first signal generating circuit generates a third signal having a frequency higher than a frequency of the second signal, based on the second signal and a first reference signal. The first filter circuit receives the third signal and allows one of a frequency component representing a sum of the frequency of the second signal and a frequency of the first reference signal and a frequency component representing a difference between the frequency of the second signal and the frequency of the first reference signal to pass through the first filter circuit and attenuates the other one of the frequency components. The second amplifier amplifies the third signal output from the first filter circuit and outputs a second amplified signal.

According to a preferred embodiment of the present disclosure, it is possible to provide a communication unit that supports a new communication standard substantially without necessarily the need of additional components.

Other features, elements, characteristics and advantages of the present disclosure will become more apparent from the following detailed description of preferred embodiments of the present disclosure with reference to the attached drawings.

DETAILED DESCRIPTION

Figure 1:
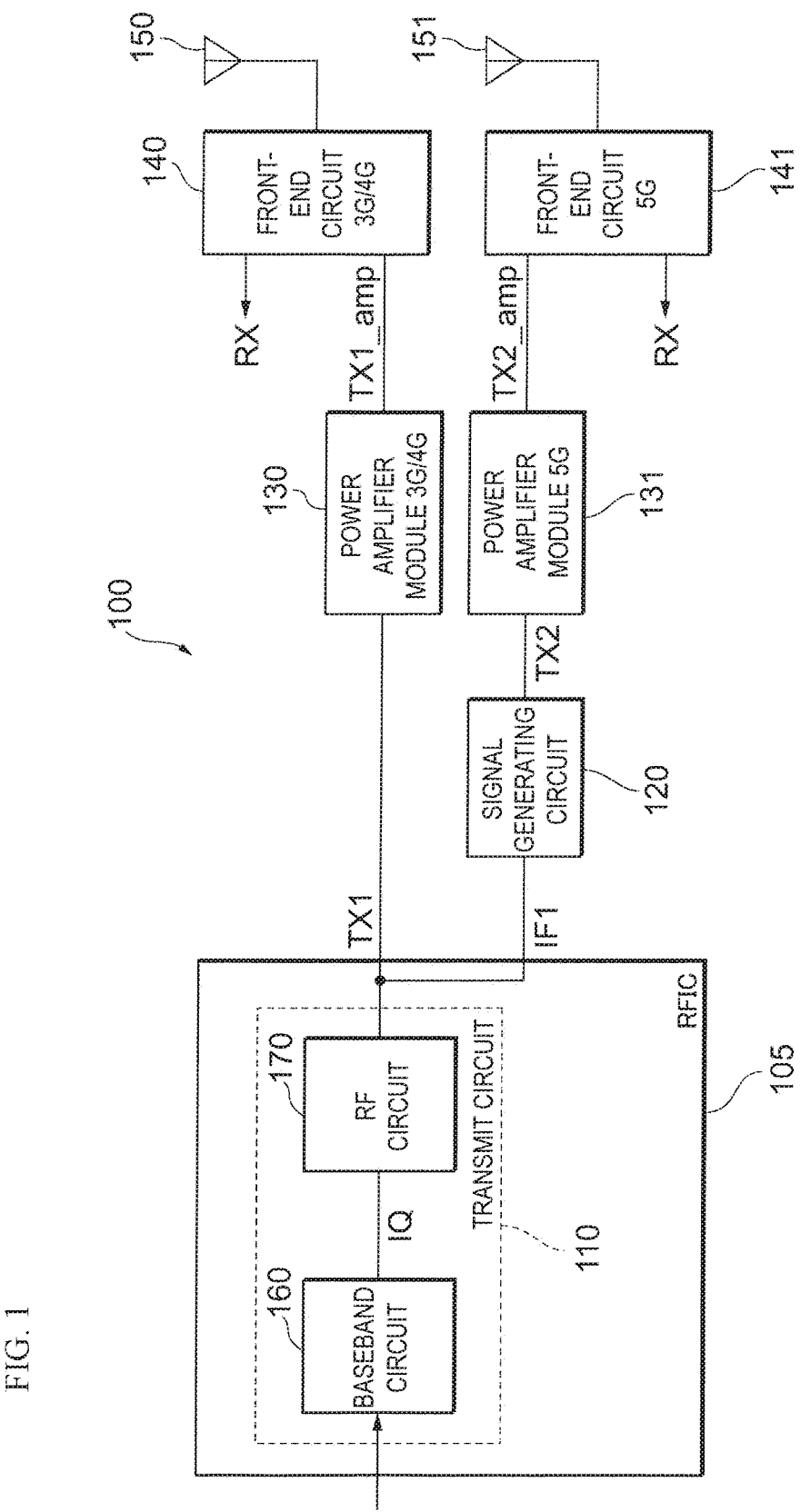
FIG. 1 illustrates an example of the configuration of a communication unit according to an embodiment of the disclosure.

An embodiment of the present disclosure will be described below with reference to the accompanying drawings. FIG. 1 illustrates an example of the configuration of a communication unit 100 according to an embodiment. The communication unit 100 is used in a mobile communication device, such as a cellular phone, for sending and receiving various signals, such as sound and data signals, with a base station. The communication unit 100 supports multiple communication bands (multimode). In this embodiment, the communication unit 100 supports conventional communication standards and new communication standards. In this specification, the conventional communication standards (hereinafter called "conventional modes") are communication standards using frequencies in the C band (about 4 to 8 GHz) or lower bands. The C band is one of the microwave-frequency bands according to IEEE standards (hereinafter simply called "IEEE C band", and the other bands will also be called likewise, "IEEE X band", for example). Examples of the conventional modes are 2G, 3G, and 4G. The new communication standards (hereinafter called "new modes") are communication standards using frequencies in the IEEE X band (about 8 to 12 GHz) or higher bands. An example of the new modes is 5G. The communication unit 100 may support multiple frequency bands (multiband) in each communication standard. In this embodiment, a new mode supports a low band (IEEE Ku band (about 12 to 18 GHz band), for example), a middle band (IEEE Ka band (about 26 to 40 GHz band), for example), and a high band (IEEE V band (about 40 to 75 GHz band), for example).

The communication unit 100 supports both of uplink communication from a mobile terminal to a base station and downlink communication from a base station to a mobile terminal. For the sake of description, in the communication unit 100, the configuration corresponding to downlink communication will be omitted, and the configuration corresponding to uplink communication will be discussed.

As shown in FIG. 1, the communication unit 100 includes a radio frequency integrated circuit (RFIC) 105, a signal generating circuit 120, power amplifier modules 130 and 131, front-end circuits 140 and 141, and antennas 150 and 151.

The RFIC 105 includes a transmit circuit 110. The transmit circuit 110 (first transmit circuit) includes a baseband circuit 160 and a RF circuit 170. The transmit circuit 110 may include plural transmit circuits in accordance with the modulation method and the frequency band.

The baseband circuit 160 modulates an input signal (first input signal), such as a sound or data signal, based on a modulation method, such as quadrature amplitude modulation (QAM), and outputs the modulated signal. In this embodiment, the modulated signal is output from the baseband circuit 160 as IQ signals representing the amplitude and the phase on an IQ plane. The frequency of the IQ signals is about several megahertz to several hundred megahertz, for example.

The RF circuit 170 generates and outputs a transmit signal for performing wireless communication or an intermediate frequency (IF) signal for generating a transmit signal, based on the IQ signals output from the baseband circuit 160. More specifically, if the input signal is based on a conventional mode, the RF circuit 170 outputs a transmit signal TX1 (first signal). If the input signal is based on a new mode, the RF circuit 170 outputs an IF signal IF1 (second signal). The RF circuit 170 calculates a transmit signal in the following manner, for example. The RF circuit 170 combines an I signal and a carrier signal in a multiplier and also combines a Q signal and a signal 90° out of phase with the carrier signal in a multiplier, and combines these composite signals in a subtractor. The transmit circuit 110 may output the transmit signal TX1 or the IF signal IF1 from the same terminal.

The IF signal IF1 may be a signal of a frequency (about 5 to 10 GHz, for example) which is lower than the frequency (about 15 GHz or 28 GHz, for example) of a transmit signal TX2 (third signal) and which can be generated by the transmit circuit 110 supporting the conventional modes. It is thus possible to generate the transmit signal TX2 of a new mode by using the transmit circuit 110 supporting the conventional modes, without necessarily providing an extra transmit circuit for a new mode in the communication unit 100.

The signal generating circuit 120 (first signal generating circuit) receives the IF signal IF1 from the RF circuit 170 and generates the transmit signal TX2, based on the IF signal IF1 and a local signal. Details of the configuration of the signal generating circuit 120 will be discussed later.

The power amplifier modules 130 and 131 each amplify power of an input transmit signal to a level necessary for transmitting the signal to a base station. The power amplifier module 130 includes an amplifier (first amplifier), and amplifies the transmit signal TX1 in a frequency band of a conventional mode and outputs an amplified signal TX1_amp (first amplified signal). The power amplifier module 131 includes an amplifier (second amplifier), and amplifies the transmit signal TX2 corresponding to multiple frequency bands of a new mode and outputs an amplified signal TX2_amp. The power amplifier modules 130 and 131 may each include plural amplification paths for amplifying transmit signals of multiple frequency bands. Details of the configuration of the power amplifier module 131 will be discussed later.

The front-end circuits 140 and 141 each switch between a path for signals to be transmitted to the base station and a path for signals to be received from the base station. The front-end circuits 140 and 141 also perform filter processing, and more specifically, filter processing on the amplified signals TX1_amp and TX2_amp respectively supplied from the power amplifier modules 130 and 131 and received signals RX1 and RX2 respectively supplied from the antennas 150 and 151. The front-end circuits 140 and 141 may include a duplexer, a switch circuit, and a diplexer, for example.

The antennas 150 and 151 respectively transmit the amplified signals TX1_amp and TX2_amp output from the front-end circuits 140 and 141 and respectively receive the received signals RX1 and RX2 transmitted from the base station.

The configuration in which the transmit signal TX2 of a new mode is generated and amplified in the communication unit 100 will be discussed below with reference to FIG. 2. For the sake of simple description, it is assumed that the communication unit 100 supports two frequency bands of a new mode. However, this is only an example, and the communication unit 100 may support one frequency band or three or more frequency bands of a new mode.

It is now assumed that, as examples of two frequency bands, a transmit signal of a transmit frequency of about 15 GHz included in the IEEE Ku band (about 12 to 18 GHz band) and a transmit signal of a transmit frequency of about 28 GHz included in the IEEE Ka band (about 26 to 40 GHz band) will be generated. It is also assumed that the transmit signal of one frequency band BAND_A is TX2a, the transmit frequency of this transmit signal is fTX2a=about 15 GHz, the transmit signal of the other frequency band BAND_B is TX2b, and the transmit frequency of this transmit signal is fTX2b=about 28 GHz. A detailed description of the configuration in which the transmit signal TX1 of a conventional mode is generated and amplified will be omitted.

Figure 2:
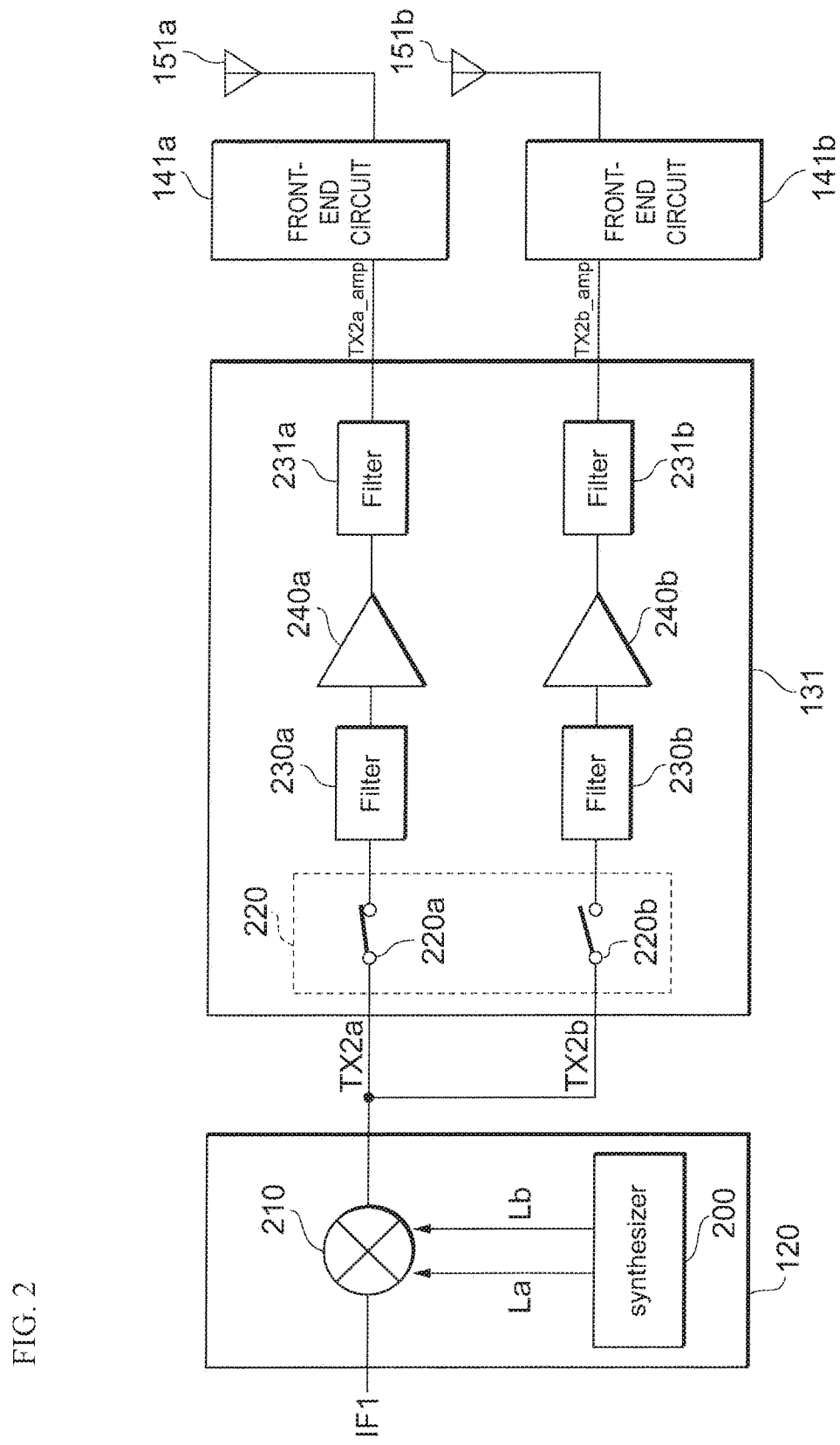
FIG. 2 illustrates examples of the configurations of a signal generating circuit and a power amplifier module.

FIG. 2 illustrates examples of the configurations of the signal generating circuit 120 and the power amplifier module 131.

The signal generating circuit 120 includes a synthesizer 200 and a multiplier 210.

The synthesizer 200 generates a local signal having a predetermined frequency. The synthesizer 200 may be constituted by a phase-locked loop (PLL) circuit. In this embodiment, the synthesizer 200 generates and outputs a local signal La (first reference signal) (frequency fLa=about 10 GHz) for generating a transmit signal in the frequency band BAND_A or a local signal Lb (second reference signal) (frequency fLb=about 23 GHz) for generating a transmit signal in the frequency band BAND_B.

The multiplier 210 combines the local signal La supplied from the synthesizer 200 and the IF signal IF1 supplied from the RF circuit 170 so as to generate a transmit signal TX2a (third signal), and outputs it. Similarly, the multiplier 210 combines the local signal Lb supplied from the synthesizer 200 and the IF signal IF1 supplied from the RF circuit 170 so as to generate a transmit signal TX2b (fourth signal), and outputs it. If the IF signal IF1 is not supplied to the multiplier 210, the synthesizer 200 and the multiplier 210 may be turned OFF so that a local signal and a transmit signal will not be generated. The frequencies of the signals generated by the multiplier 210 will be discussed with reference to FIG. 3.

Figure 3:
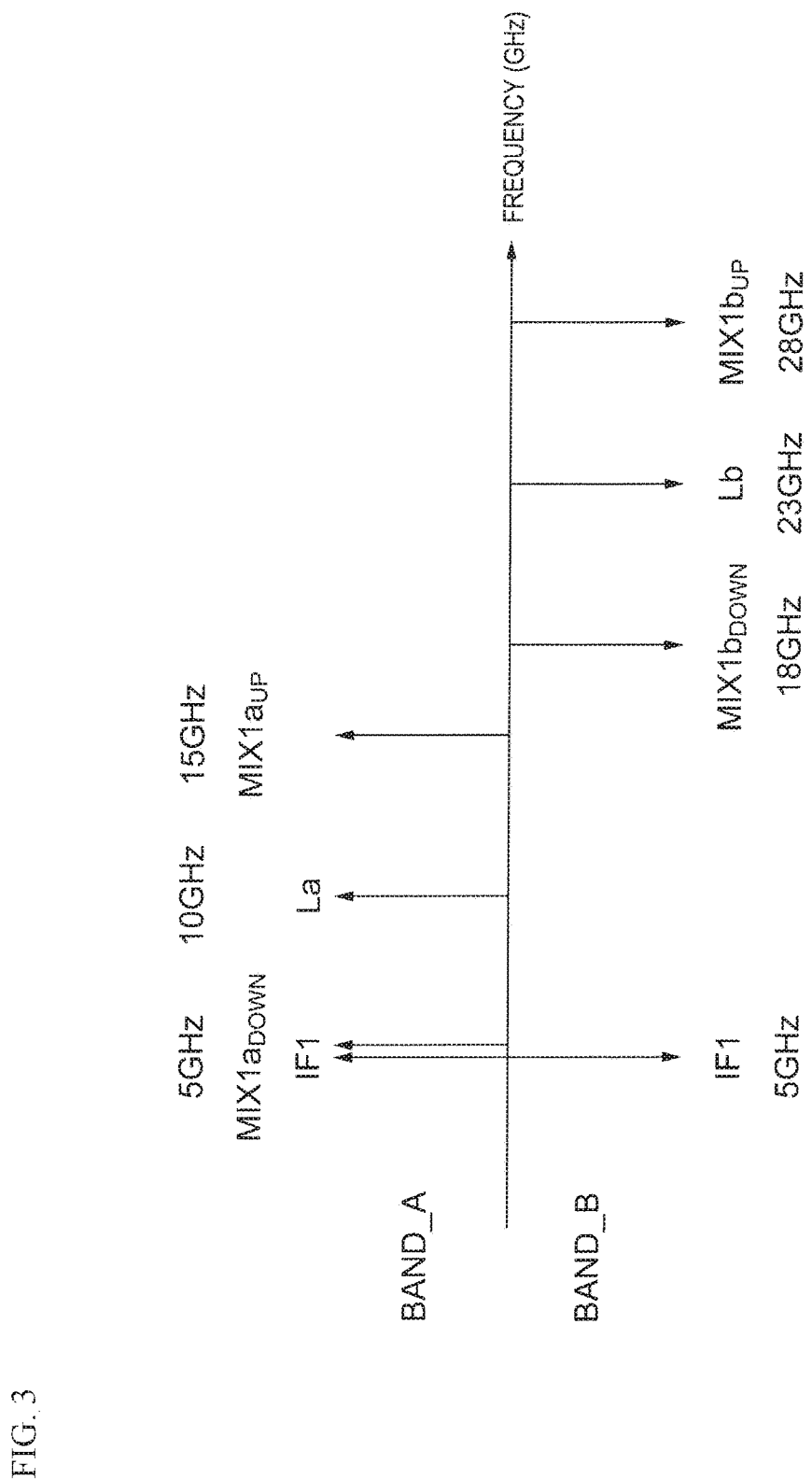
FIG. 3 illustrates an example of a state where transmit signals are generated from an intermediate frequency (IF) signal and local signals.

FIG. 3 illustrates an example of a state where the transmit signals TX2a and TX2b are respectively generated from the IF signal IF1 and the local signals La and Lb. The multiplier 210 outputs a signal of a frequency representing the sum of the frequencies of the two signals and also outputs a signal of a frequency representing the difference between the frequencies of the two signals. That is, if the local signal La (frequency fLa=about 10 GHz) and the IF signal IF1 (frequency fIF=about 5 GHz) are input, the multiplier 210 outputs signals including a signal $MIX1a_{UP}$ having a frequency fLa+fIF=10+5=15 GHz and a signal $MIX1a_{DOWN}$ having a frequency fLa−fIF=10−5=5 GHz. In this embodiment, the signal $MIX1a_{UP}$ of about 15 GHz is used as the transmit signal TX2a, and the signal $MIX1a_{DOWN}$ of about 5 GHz is an unwanted signal (also called an image signal).

Similarly, if the local signal Lb (frequency fLb=about 23 GHz) and the IF signal IF1 (frequency fIF=about 5 GHz) are input, the multiplier 210 outputs signals including a signal $MIX1b_{UP}$ having a frequency fLb+fIF=23+5=28 GHz and a signal $MIX1b_{DOWN}$ having a frequency fLb−fIF=23−5=18 GHz. In this embodiment, the signal $MIX1b_{UP}$ of about 28 GHz is used as the transmit signal TX2b, and the signal $MIX1b_{DOWN}$ of about 18 GHz is an image signal. The attenuation of the image signals $MIX1a_{DOWN}$ and $MIX1b_{DOWN}$ will be discussed later, together with an explanation of the configuration of the power amplifier module 131.

Referring back to FIG. 2, the power amplifier module 131 amplifies the transmit signals TX2a and TX2b output from the signal generating circuit 120 and outputs amplified signals TX2a_amp and TX2b_amp. The power amplifier module 131 includes a switch circuit 220, filter circuits 230a, 230b, 231a, and 231b, and amplifiers 240a and 240b. In this embodiment, a switch element 220a, the filter circuits 230a and 231a, and the amplifier 240a form an amplification path for the transmit signal TX2a of the frequency band BAND_A, while a switch element 220b, the filter circuits 230b and 231b, and the amplifier 240b form an amplification path for the transmit signal TX2b of the frequency band BAND_B. For the sake of simple representation, the other elements forming the power amplifier module 131 (such as a bias circuit and a matching circuit) are not shown in FIG. 2.

The switch circuit 220 (second switch circuit) supplies only one of the transmit signals TX2a and TX2b in the two frequency bands to the associated amplification path and performs control so that the two amplifiers 240a and 240b will not operate at the same time. The switch circuit 220 includes the switch elements 220a and 220b. The switch elements 220a and 220b connect or disconnect the signal generating circuit 120 to or from the power amplifier module 131 in the individual amplification paths. When one of the switch elements 220a and 220b is ON, the other one of the switch elements 220a and 220b is OFF. When one of the transmit signals TX2a and TX2b is supplied to the associated amplification path, the other one of the transmit signals TX2a and TX2b is not supplied to the associated amplification path. It is thus less likely that a transmit signal which may leak from one amplification path will be input into the other amplification path. That is, the isolation between the amplification paths of the transmit signals TX2a and TX2b can be enhanced.

With the above-described configuration, when signals in relatively close frequency bands are generated in the signal generating circuit 120, it is less likely that one signal will influence the other signal as noise. More specifically, for example, the frequency of the signal $MIX1a_{UP}$ (about 15 GHz) generated as a transmit signal in the frequency band BAND_A and the frequency of the $MIX1b_{DOWN}$ (about 18 GHz) generated as a signal to be attenuated in the frequency band BAND_B are relatively close to each other (see FIG. 3).

The switch elements 220a and 220b may be constituted by metal-oxide-semiconductor field-effect transistors (MOSFETs) or bipolar transistors, such as heterojunction bipolar transistors (HBTs). Switch elements 300, 620a, 620b, and 700, which will be discussed later, may also be constituted likewise.

The filter circuits 230a and 230b (first and second filter circuits) are filters for attenuating the above-described image signals $MIX1a_{DOWN}$ and $MIX1b_{DOWN}$. More specifically, among the signals generated by the signal generating circuit 120, the filter circuit 230a allows frequency components of the signal $MIX1a_{UP}$ to pass through the filter circuit 230a and attenuates frequency components of the signal $MIX1a_{DOWN}$. Among the signals generated by the signal generating circuit 120, the filter circuit 230b allows frequency components of the signal $MIX1b_{UP}$ to pass through the filter circuit 230b and attenuates frequency components of the signal $MIX1b_{DOWN}$.

The filter circuit 230a may be a band pass filter circuit or a high pass filter circuit that allows the frequency components of the signal $MIX1a_{UP}$ (about 15 GHz) to pass through the filter circuit 230a and attenuates the frequency components of the signal $MIX1a_{DOWN}$ (about 5 GHz), which is lower than the frequency of the signal $MIX1a_{UP}$ (about 15 GHz) (see FIG. 3). Similarly, the filter circuit 230b may be a band pass filter circuit or a high pass filter circuit that allows the frequency components of the signal $MIX1b_{UP}$ (about 28 GHz) to pass through the filter circuit 230b and attenuates the frequency components of the $MIX1b_{DOWN}$ (about 18 GHz), which is lower than the frequency of the signal $MIX1b_{UP}$ (28 GHz) (see FIG. 3).

Forming the filter circuits 230a and 230b as band pass filter circuits can attenuate, not only the frequency components of the signals $MIX1a_{DOWN}$ and $MIX1b_{DOWN}$, but also a signal leaking from the amplification path in the other frequency band. The filter circuits 230a and 230b can also attenuate harmonics of transmit signals.

The amplifiers 240a and 240b (second and third amplifiers) respectively amplify the transmit signals TX2a and TX2b output from the filter circuits 230a and 230b, and respectively output amplified signals TX2a_amp and TX2b_amp (second and third amplified signals). The amplifiers 240a and 240b may be constituted by MOSFETs or bipolar transistors, such as HBTs. The amplifiers 240a and 240b may be each constituted by plural stages of amplifiers.

The filter circuits 231a and 231b attenuate harmonics of the amplified signals TX2a_amp and TX2b_amp and noise caused by the amplifiers 240a and 240b. The filter circuits 231a and 231b may be band pass filter circuits or low pass filter circuits.

The amplified signals TX2a_amp and TX2b_amp output from the power amplifier module 131 are respectively transmitted from the antennas 151a and 151b via the front-end circuits 141a and 141b.

In the communication unit 100 shown in FIG. 1 configured as described above, the transmit circuit 110 does not directly generate a transmit signal in a frequency band of a new mode, but generates an IF signal instead. Then, the signal generating circuit 120 generates a transmit signal in a frequency band of a new mode. By using the transmit circuit 110 supporting conventional modes, the communication unit 100 is able to support a new communication standard (new mode) substantially without necessarily the need of additional components.

In this embodiment, the two antennas 151a and 151b are respectively provided for the frequency bands BAND_A and BAND_B. Alternatively, a single antenna may be used for all multiple frequency bands, and a switch circuit included in a front-end circuit may switch between a transmit signal supplied to the antenna and a received signal supplied from the antenna. The use of the single antenna for all multiple frequency bands can reduce the size of a communication unit.

The combination of frequencies of transmit signals output from the communication unit 100 is not restricted to the above-described combination (about 15 GHz and 28 GHz). For example, frequencies (about 28 GHz and 39 GHz) both included in the IEEE Ka band (about 26 to 40 GHz band) may be output from the communication unit 100. Such a case will be discussed below with reference to FIG. 4. It is assumed that the transmit signal of one frequency band BAND_C is TX2c, the transmit frequency of this transmit signal is fTX2c=about 28 GHz, the transmit signal of the other frequency band BAND_D is TX2d, and the transmit frequency of this transmit signal is fTX2d=about 39 GHz.

Figure 4:
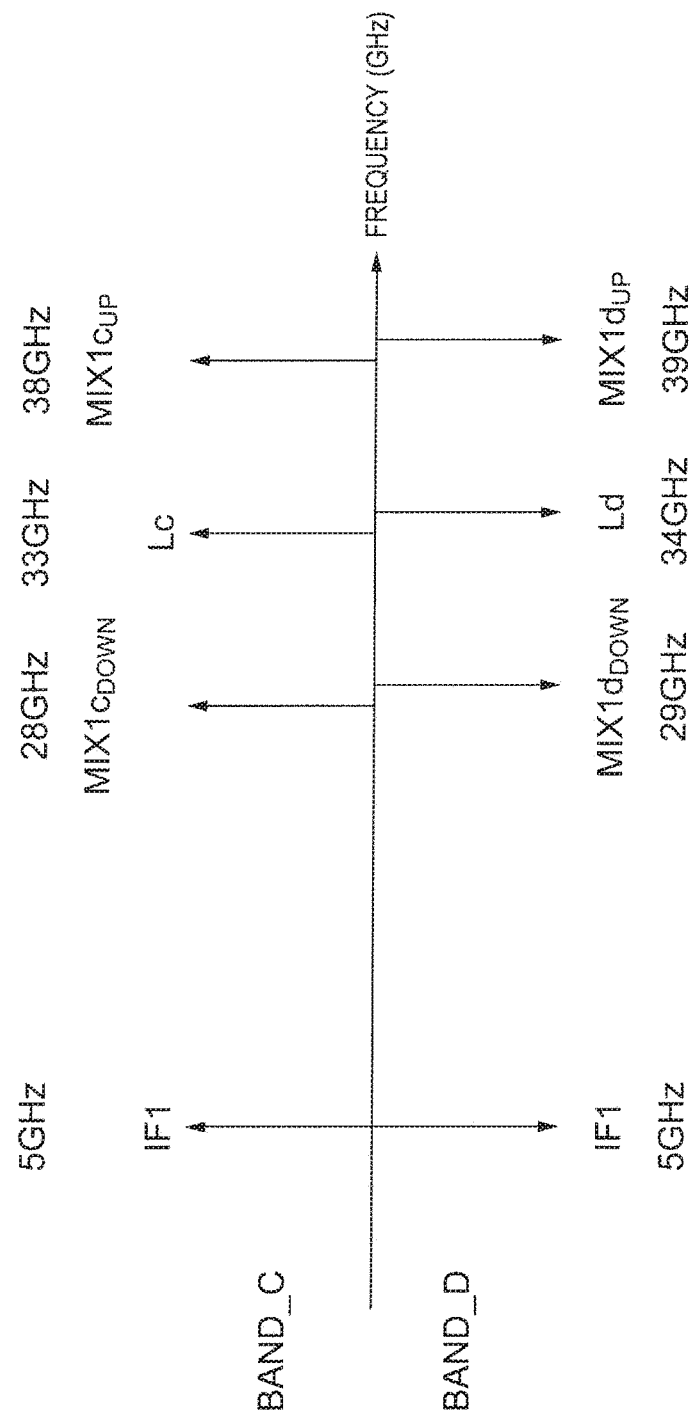
FIG. 4 illustrates another example of a state where transmit signals are generated from the IF signal and local signals.

FIG. 4 illustrates an example of a state where the transmit signals TX2c and TX2d are generated from the IF signal IF1 and local signals Lc and Ld. In this embodiment, the synthesizer 200 generates and outputs a local signal Lc (first reference signal) (frequency fLc=about 33 GHz) for generating a transmit signal in the frequency band BAND_C or a local signal Ld (second reference signal) (frequency fLd=about 34 GHz) for generating a transmit signal in the frequency band BAND_D. The frequency of the local signal Lc is relatively close to that of the local signal Ld, and the two local signals Lc and Ld may be generated by the adjustment in the synthesizer 200, for example.

The multiplier 210 generates and outputs, from the local signal Lc (frequency fLc=about 33 GHz) and the IF signal IF1 (fIF=about 5 GHz), signals including a signal $MIX1c_{UP}$ having a frequency fLc+fIF=33+5=38 GHz and a signal $MIX1c_{DOWN}$ having a frequency fLc−fIF=33−5=28 GHz. Similarly, the multiplier 210 generates and outputs, from the IF local signal Ld (frequency fLd=about 34 GHz) and the IF signal IF1 (fIF=about 5 GHz), signals including a signal $MIX1d_{UP}$ having a frequency fLd+fIF=34+5=39 GHz and a signal $MIX1d_{DOWN}$ having a frequency fLd−fIF=34−5=29 GHz.

The filter circuits 230a and 230b attenuate the image signals $MIX1c_{UP}$ and $MIX1d_{DOWN}$ output from the signal generating circuit 120. More specifically, the filter circuit 230a is a band pass filter circuit or a low pass filter circuit that allows frequency components of the signal $MIX1c_{DOWN}$ (about 28 GHz) to pass through the filter circuit 230a and attenuates frequency components of the $MIX1c_{UP}$ (about 38 GHz), which is higher than the frequency components of the signal $MIX1c_{DOWN}$ (about 28 GHz). The filter circuit 230a preferably attenuates frequency components of the signal $MIX1d_{DOWN}$ (about 29 GHz) generated in the path of the frequency band BAND_D.

The filter circuit 230b is a band pass filter circuit or a high pass filter circuit that allows frequency components of the signal $MIX1d_{UP}$ (about 39 GHz) to pass through the filter circuit 230b and attenuates frequency components of the $MIX1d_{DOWN}$ (about 29 GHz), which is lower than the frequency components of the signal $MIX1d_{UP}$ (about 39 GHz). The filter circuit 230b preferably attenuates the frequency components of the signal $MIX1c_{UP}$ (about 38 GHz) generated in the path of the frequency band BAND_C.

As described above, in the communication unit 100, the power amplifier module 131 includes the filter circuits 230a and 230b. This makes it possible to use both of the frequency components representing the sum of the frequencies of the IF signal and a local signal and the frequency components representing the difference between the frequencies of the IF signal and the local signal as transmit signals.

The communication unit 100 may generate a transmit signal of an even higher frequency. For example, if the frequency of a transmit signal is about 45 GHz included in the IEEE V band (about 40 to 75 GHz band), the synthesizer 200 may generate a local signal of about 35 GHz, and the RF circuit 170 may generate an IF signal of about 10 GHz (that is, an integral multiple of the frequency at 5 GHz of the IF signal IF1). The multiplier 210 generates and outputs signals including frequency components representing the sum of the frequencies of the local signal and the IF signal (35+10=45 GHz) and frequency components representing the difference between the frequencies of the local signal and the IF signal (35−10=25 GHz). The filter circuit 230b may be a high pass filter circuit or a band pass filter circuit that allows the frequency components (about 45 GHz) to pass through the filter circuit 230b and attenuates the frequency components (about 25 GHz). Then, a transmit signal of about 45 GHz is generated. When a high-frequency local signal is used, it may leak from the signal generating circuit 120 and be input into the power amplifier module 131, which may cause noise. The filter circuit 230b thus preferably attenuates the frequency components (about 35 GHz) of the local signal, in addition to the frequency components (about 25 GHz) representing the difference between the local signal and the IF signal.

Figure 5:
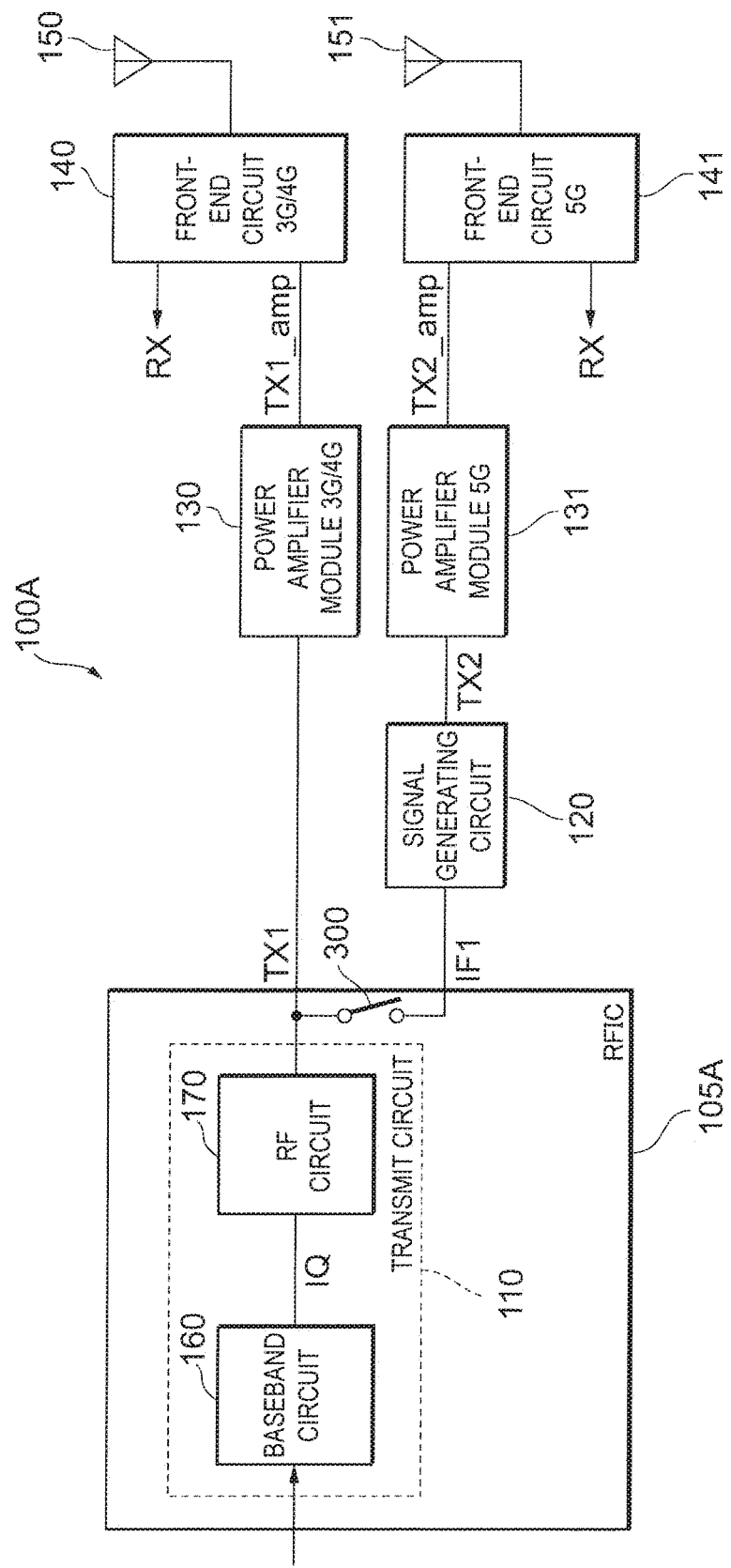
FIG. 5 illustrates another example of the configuration of the communication unit shown in FIG. 1.

FIG. 5 illustrates another example of the configuration of the communication unit 100 (communication unit 100A) according to the embodiment. The communication unit 100A is different from the communication unit 100 shown in FIG. 1 in that it includes a switch element 300 in addition to the elements forming the communication unit 100.

The switch element 300 (first switch circuit) is disposed between the transmit circuit 110 and the signal generating circuit 120, and connects or disconnects the transmit circuit 110 to or from the signal generating circuit 120. More specifically, the switch element 300 is turned ON when the communication unit 100A generates a transmit signal in a frequency band of a new mode, and the switch element 300 is turned OFF when the communication unit 100A does not generate a transmit signal in a frequency band of a new mode. It is thus less likely that, when processing a transmit signal of a conventional mode and that of a new mode, a transmit signal of one mode will be input into the path of a transmit signal of the other mode. The switch element 300 may be disposed within a RFIC 105A, as shown in FIG. 5, or may be disposed outside the RFIC 105A.

Figure 6:
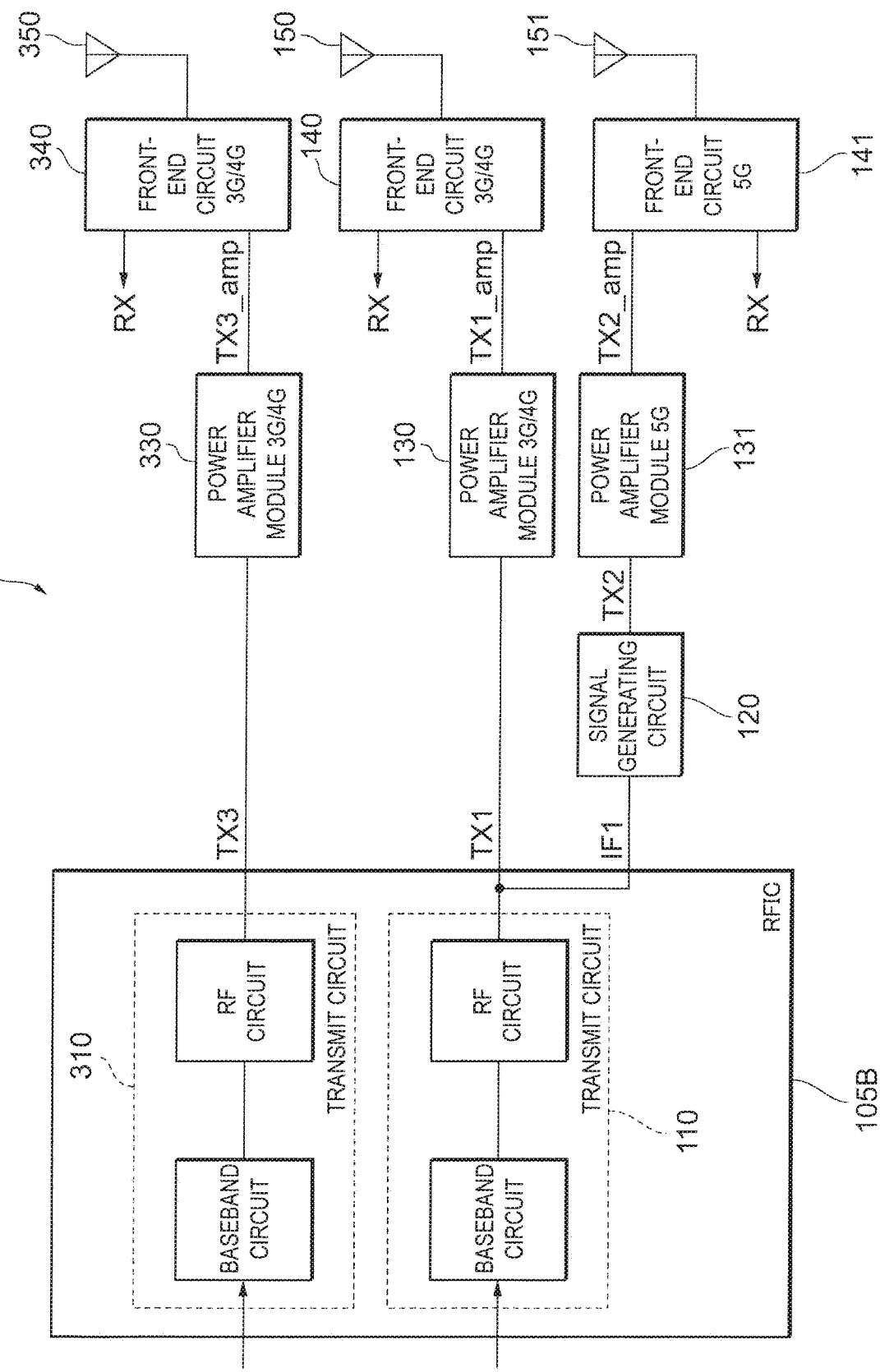
FIG. 6 illustrates another example of the configuration of the communication unit shown in FIG. 1.

FIG. 6 illustrates another example of the configuration of the communication unit 100 (communication unit 100B) according to the embodiment. The communication unit 100B is different from the communication unit 100 shown in FIG. 1 in that it includes a transmit circuit 310, a power amplifier module 330, a front-end circuit 340, and an antenna 350 corresponding to a transmit signal TX3 in a frequency band of a conventional mode, in addition to the elements forming the communication unit 100.

The transmit circuit 310 (second transmit circuit) modulates an input signal (second input signal), such as a sound or data signal, and outputs a transmit signal TX3 (fifth signal).

The power amplifier module 330 includes an amplifier (fourth amplifier), and amplifies the transmit signal TX3 in a frequency band of a conventional mode and outputs an amplified signal TX3_amp (fourth amplified signal). The amplified signal TX3_amp output from the power amplifier module 330 is transmitted from the antenna 350 via the front-end circuit 340.

The detailed configurations of the transmit circuit 310, the power amplifier module 330, the front-end circuit 340, and the antenna 350 are similar to those of the transmit circuit 110, the power amplifier module 130, the front-end circuit 140, and the antenna 150 shown in FIG. 1, and a detailed explanation thereof will be omitted.

With this configuration, too, by using the transmit circuits 110 and 310 supporting conventional modes, the communication unit 100B is able to support a new communication standard (new mode) substantially without necessarily the need of additional components. The communication unit 100B, which is capable of simultaneously transmit signals of multiple frequency bands, is applicable to a mobile terminal supporting carrier aggregation, for example. The switch element 300 shown in FIG. 5 may also be used in the communication unit 100B. As shown in FIG. 6, the transmit circuits 110 and 310 may be included in a single RFIC 105B. Alternatively, the communication unit 100B may include plural RFICs, and the RFICs may include the respective transmit circuits 110 and 310.

Figure 7:
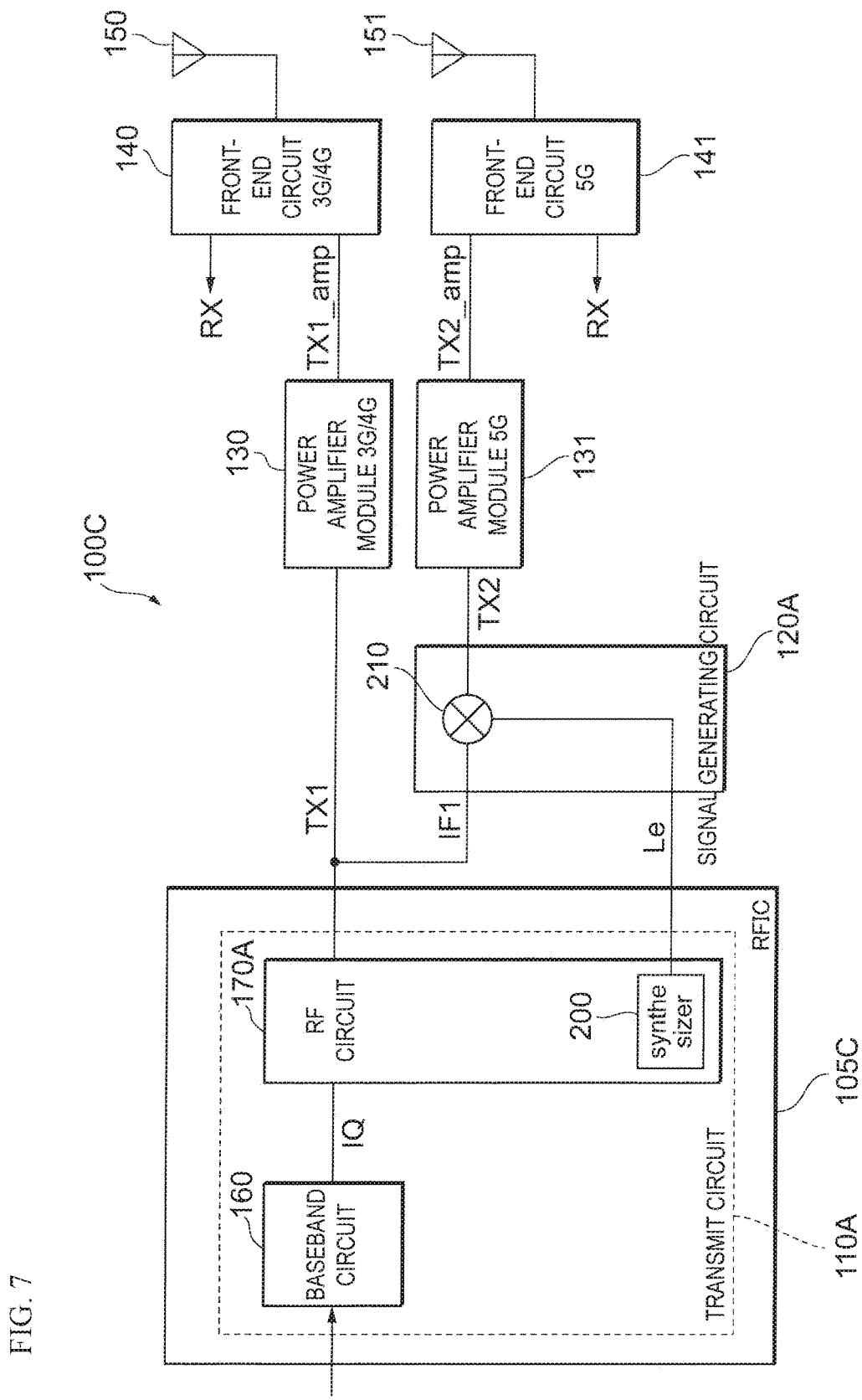
FIG. 7 illustrates another example of the configuration of the communication unit shown in FIG. 1.

FIG. 7 illustrates another example of the configuration of the communication unit 100 (communication unit 100C) according to the embodiment. The communication unit 100C is different from the communication unit 100 shown in FIG. 1 in that it includes a RFIC 105C, a transmit circuit 110A, a RF circuit 170A, and a signal generating circuit 120A, instead of the RFIC 105, the transmit circuit 110, the RF circuit 170, and the signal generating circuit 120. More specifically, in the communication unit 100C, the synthesizer 200 is formed in the RFIC 105C.

The synthesizer 200 generates a local signal Le having a predetermined frequency and outputs it to the signal generating circuit 120A. For example, if the frequency of the local signal Le is about 23 GHz and the frequency of the IF signal IF1 is about 5 GHz, the synthesizer 200 generates a transmit signal of a transmit frequency of about 28 GHz (23 GHz+5 GHz). The frequency of the local signal Le generated by the synthesizer 200 is not restricted to 23 GHz. Adjusting of the frequency of the local signal Le can generate transmit signals of various transmit frequencies. Details of the generation of signals in the multiplier 210 are similar to those in the communication unit 100, and a detailed explanation thereof will be omitted.

With this configuration, too, by using the transmit circuit 110A supporting conventional modes, the communication unit 100C is able to support a new communication standard (new mode) substantially without necessarily the need of additional components. The switch element 300 shown in FIG. 5 may also be used in the communication unit 100C.

Figure 8:
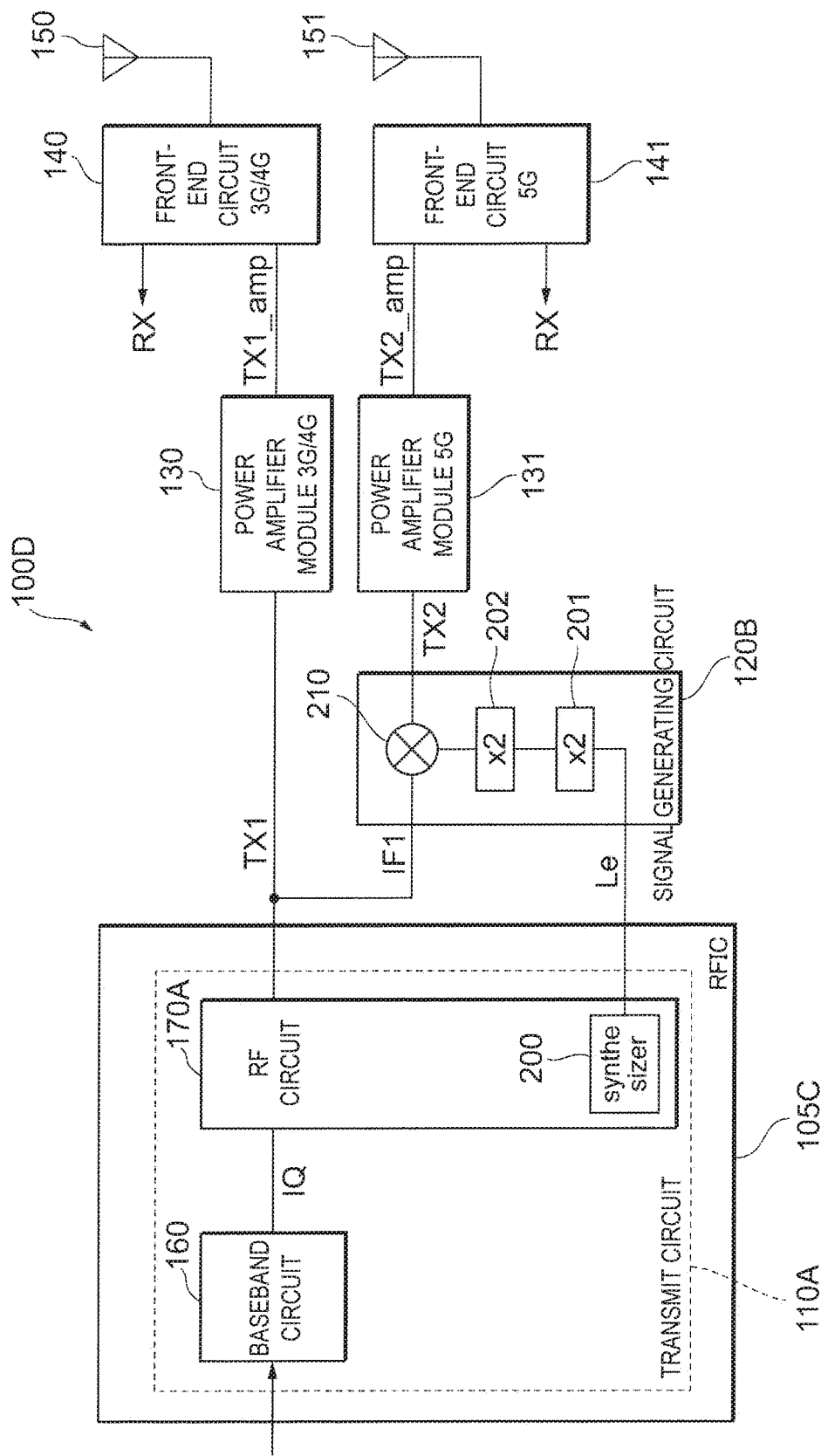
FIG. 8 illustrates another example of the configuration of the communication unit shown in FIG. 1.

FIG. 8 illustrates another example of the configuration of the communication unit 100 (communication unit 100D) according to the embodiment. The communication unit 100D is different from the communication unit 100C shown in FIG. 7 in that it includes a signal generating circuit 120B instead of the signal generating circuit 120A. The signal generating circuit 120B includes frequency multipliers 201 and 202, in addition to the multiplier 210.

The frequency multipliers 201 and 202 multiply the frequency of the local signal Le received from the synthesizer 200 by a factor of N (N is a natural number) and output the multiplied local signal Le. In this embodiment, both of the frequency multipliers 201 and 202 are frequency doublers that double the frequency of the local signal Le. For example, if the frequency of the local signal Le is about 8.5 GHz and the frequency of the IF signal IF1 is about 5 GHz, the frequency multipliers 201 and 202 generate a transmit signal of a transmit frequency of about 39 GHz (8.5 GHz× 2×2+5 GHz). If the frequency of the local signal Le is about 15.25 to 17.75 GHz and the frequency of the IF signal IF1 is about 5 GHz, the frequency multipliers 201 and 202 generate a transmit signal of a transmit frequency of about 66 to 76 GHz (15.25 to 17.75 GHz×2×2+5 GHz). The frequency multipliers 201 and 202 are not restricted to a particular type, and may be constituted by a PLL circuit, for example. Details of the generation of signals in the multiplier 210 are similar to those in the communication unit 100, and a detailed explanation thereof will be omitted.

With this configuration, too, by using the transmit circuit 110A supporting conventional modes, the communication unit 100D is able to support a new communication standard (new mode) substantially without the need of additional components. The switch element 300 shown in FIG. 5 may also be used in the communication unit 100D.

Figure 9:
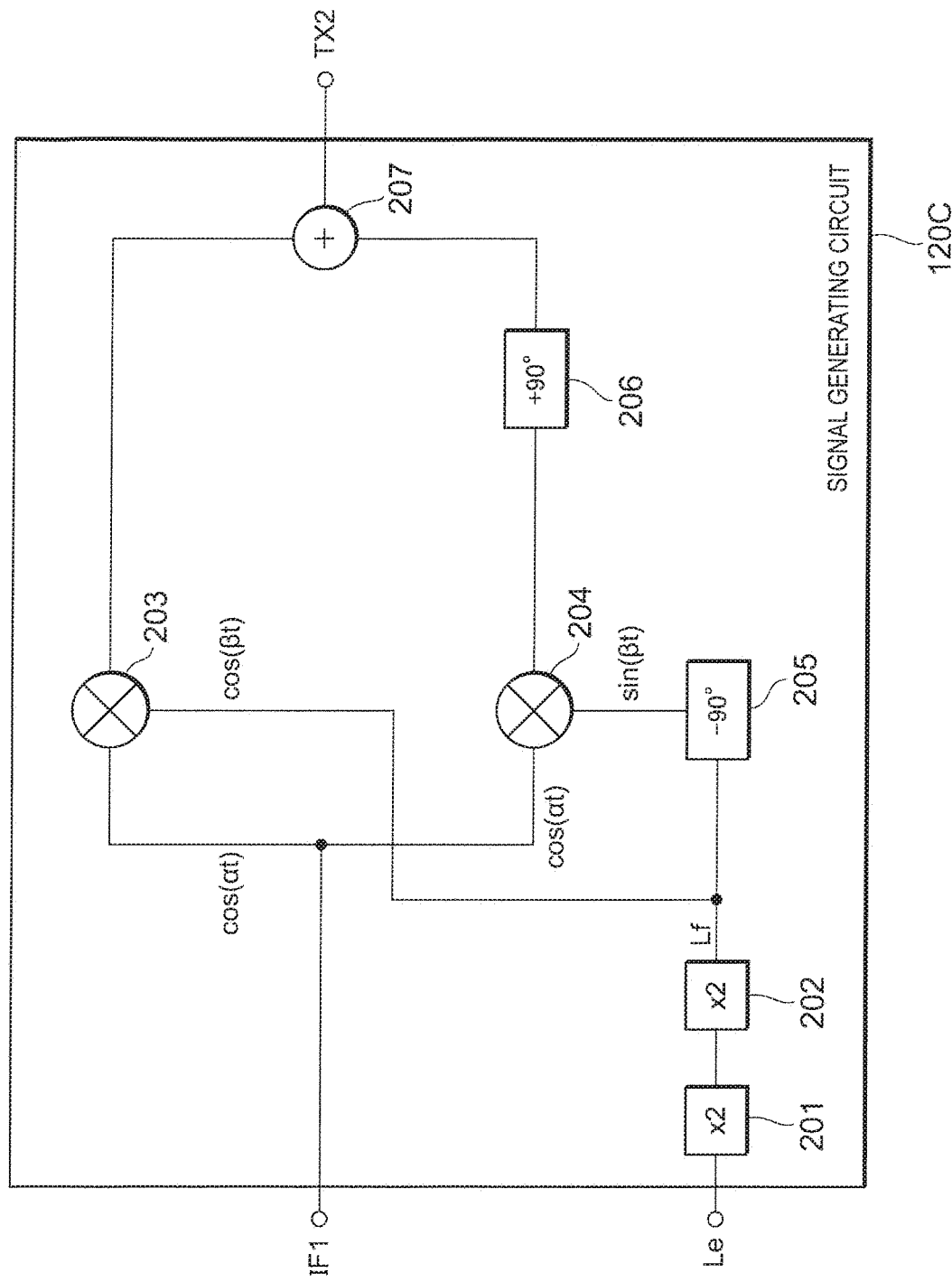
FIG. 9 illustrates another example of the configuration of the signal generating circuit.

FIG. 9 illustrates another example of the configuration of the signal generating circuit 120 (signal generating circuit 120C). The signal generating circuit 120C includes an image rejection mixer. More specifically, the signal generating circuit 120C includes multipliers 203 and 204, phase shifters 205 and 206, and an adder 207, in addition to the elements forming the signal generating circuit 120B.

The signal generating circuit 120C generates a transmit signal TX2 from the IF signal IF1 and the local signal Le. The operation of the image rejection mixer will be discussed below. It is assumed that the angular frequency of the IF signal IF1 is $\alpha$, the angular frequency of a local signal Lf obtained by multiplying the local signal Le in the frequency multipliers 201 and 202 is $\beta$, the time is t, the angular frequency of a transmit signal to be generated is $\alpha+\beta$, and the angular frequency of an image signal is $\alpha-\beta$. For the sake of simple description, if the amplitude of each signal is 1, the IF signal IF1 is represented by $\cos(\alpha t)$ and the local signal Lf is represented by $\cos(\beta t)$.

The IF signal IF1 is distributed to the multipliers 203 and 204. The local signal Lf is also distributed to the multipliers 203 and 204. In this case, the distributed local signal Lf is directly output to the multiplier 203, while it is first output to the phase shifter 205 which provides phase lead to the local signal Lf by about 90 degrees and is then output to the multiplier 204. The multiplier 203 multiplies $\cos(\alpha t)$ and $\cos(\beta t)$ so as to generate a signal proportional to $\cos\{(\alpha+\beta)t\}+\cos\{(\alpha-\beta)t\}$. The multiplier 204 multiplies $\cos(\alpha t)$ and $\sin(\beta t)$ so as to generate a signal proportional to $\sin\{(\alpha+\beta)t\}-\sin\{(\alpha-\beta)t\}$. The signal generated in the multiplier 204 is output to the phase shifter 206 which provides phase delay to the signal by about 90 degrees, and a signal proportional to $\cos\{(\alpha+\beta)t\}-\cos\{(\alpha-\beta)t\}$ is generated. The signal output from the multiplier 203 and the signal output from the phase shifter 206 are added in the adder 207. As a result, a signal proportional to $\cos\{(\alpha-\beta)t\}$ (that is, an image signal) alone is rejected, while a signal proportional to $\cos\{(\alpha+\beta)t\}$ (that is, the transmit signal TX2) alone is output.

With the above-described configuration, the signal generating circuit 120C can generate frequency components representing the sum of the frequencies of the IF signal IF1 and the local signal Lf and reject frequency components representing the difference therebetween. The signal generating circuit 120C is able to reduce the influence of noise caused by the image signal to a smaller level than the signal generating circuit 120B. The above-configured signal generating circuit 120C is particularly effective when a transmit signal of a relatively high frequency, such as 60 GHz or higher, is generated in the communication unit 100D because the attenuation of an image signal using a filter circuit is difficult.

Figure 10:
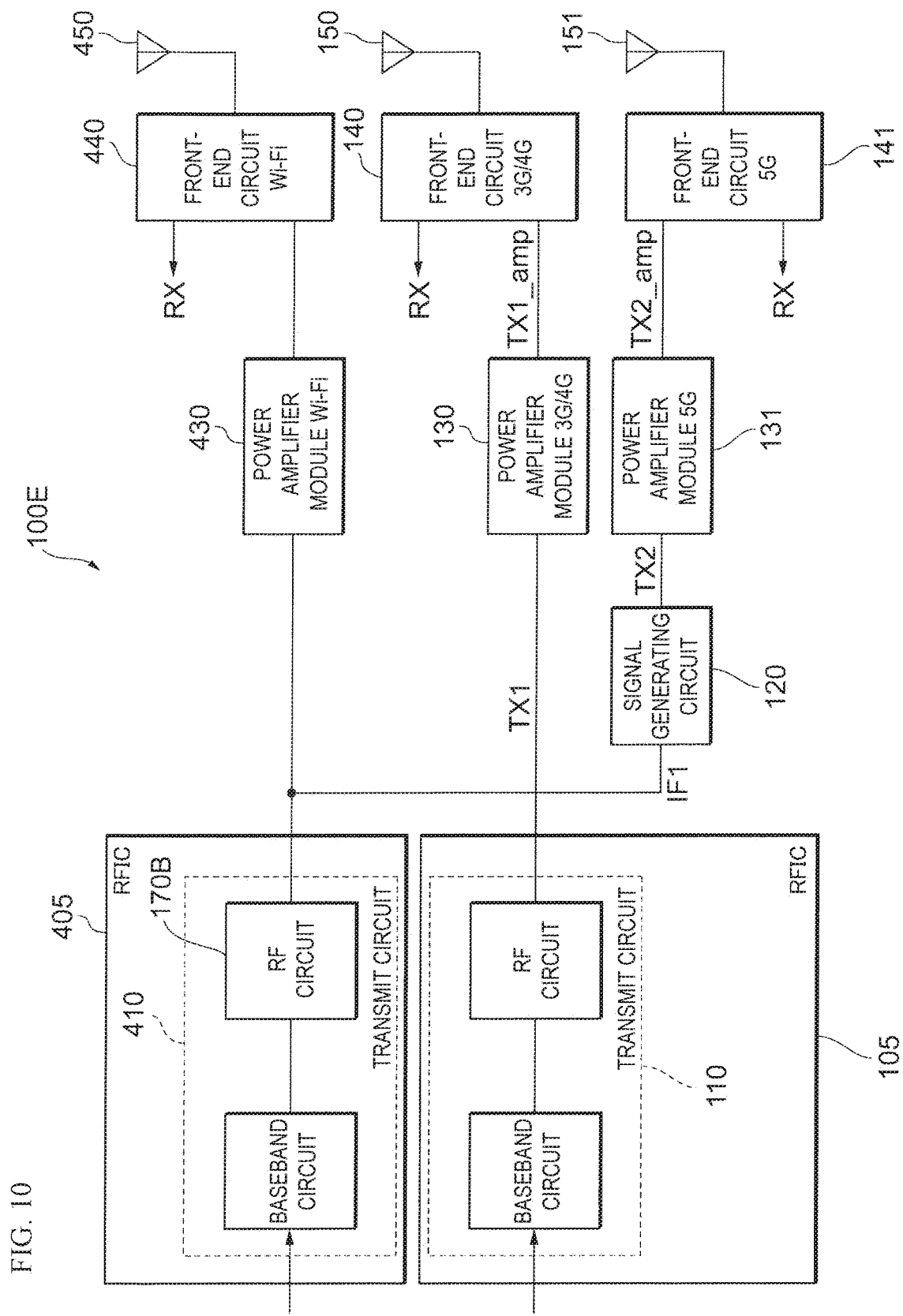
FIG. 10 illustrates another example of the configuration of the communication unit shown in FIG. 1.

FIG. 10 illustrates another example of the configuration of the communication unit 100 (communication unit 100E) according to the embodiment. The communication unit 100E is different from the communication unit 100 shown in FIG. 1 in that it includes a RFIC 405, a power amplifier module 430, a front-end circuit 440, and an antenna 450 that support a wireless local area network (LAN), such as Wi-Fi, in addition to the elements forming the communication unit 100.

The RFIC 405 includes a transmit circuit 410 (first transmit circuit) supporting a wireless LAN. In this embodiment, a RF circuit 170B included in the transmit circuit 410 generates an IF signal IF1 and outputs it to the signal generating circuit 120. The frequency of the IF signal IF1 may be about 5 GHz, for example. That is, the IF signal IF1 may be generated by the RFIC 105 supporting conventional modes, such as 3G and 4G, or by the RFIC 405 supporting a wireless LAN shown in FIG. 10. The detailed configurations of the power amplifier module 430, the front-end circuit 440, and the antenna 450 are similar to those of the power amplifier module 130, the front-end circuit 140, and the antenna 150, and a detailed explanation thereof will be omitted.

With this configuration, too, by using the transmit circuit 410 supporting a wireless LAN, the communication unit 100E is able to support a new communication standard (new mode) substantially without the need of additional components. The switch element 300 shown in FIG. 5 may also be used in the communication unit 100E. As the frequency band of 5G, it is possible that a frequency band near 5 GHz be also used. The use of such a frequency band may be handled by replacing the signal generating circuit 120 by a simple switch.

Figure 11:
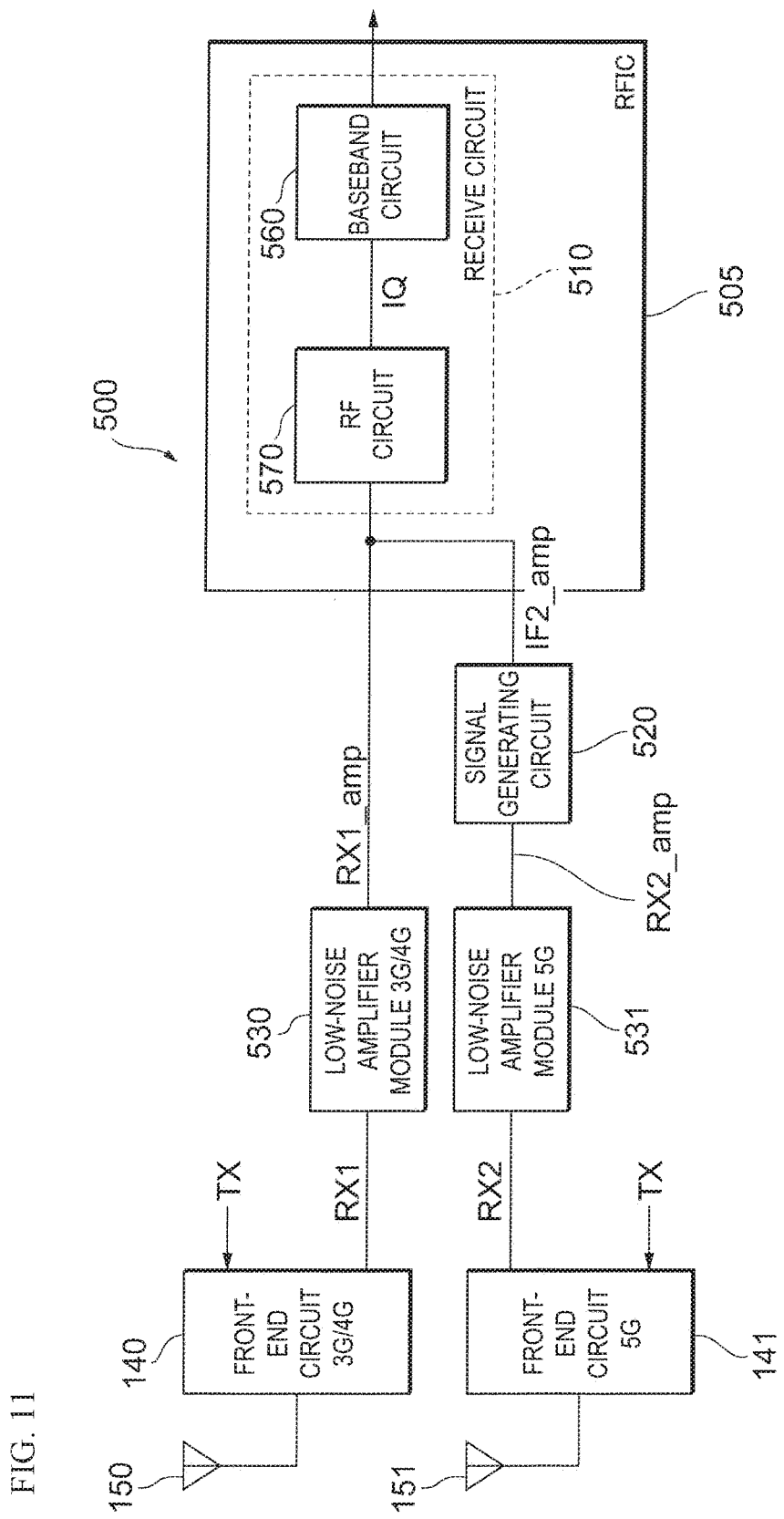
FIG. 11 illustrates an example of the configuration of another communication unit according to an embodiment of the disclosure.

FIG. 11 illustrates an example of the configuration of a communication unit 500 according to an embodiment of the disclosure. For the sake of description, in the communication unit 500, the configuration corresponding to uplink communication will be omitted, and the configuration corresponding to downlink communication will be discussed. The same elements as those of the communication unit 100 shown in FIG. 1 are designated by like reference numerals, and an explanation thereof will be omitted.

As shown in FIG. 11, the communication unit 500 includes a RFIC 505, a receive circuit 510, a signal generating circuit 520, and low-noise amplifier modules 530 and 531, instead of the RFIC 105, the transmit circuit 110, the signal generating circuit 120, and the power amplifier modules 130 and 131 shown in FIG. 1.

The low-noise amplifier modules 530 and 531 respectively amplify power of signals received by the antennas 150 and 151 and input from the front-end circuits 140 and 141 to a level necessary for demodulating the signals. The low-noise amplifier module 530 includes an amplifier (first low-noise amplifier), and amplifies a received signal RX1 (sixth signal) in a frequency band of a conventional mode and outputs an amplified signal RX1_amp (fifth amplified signal). The low-noise amplifier module 531 includes an amplifier (second low-noise amplifier), and amplifies a received signal RX2 (seventh signal) corresponding to multiple frequency bands of a new mode and outputs an amplified signal RX2_amp. The low-noise amplifier modules 530 and 531 may each include plural amplification paths for amplifying received signals of multiple frequency bands. Details of the configuration of the low-noise amplifier module 531 will be discussed later.

The signal generating circuit 520 (second signal generating circuit) receives the amplified signal RX2_amp output from the low-noise amplifier module 531, amplifies an IF signal IF2 generated based on the amplified signal RX2_amp and a local signal, and outputs an amplified signal IF2_amp. Details of the configuration of the signal generating circuit 520 will be discussed later.

The RFIC 505 includes the receive circuit 510. The receive circuit 510 (first receive circuit) includes a RF circuit 570 and a baseband circuit 560.

The RF circuit 570 generates IQ signals, based on the amplified signal RX1_amp output from the low-noise amplifier module 530 or the amplified signal IF2_amp output from the signal generating circuit 520, and outputs the IQ signals. The receive circuit 510 may receive the amplified signal RX1_amp or the amplified signal IF2_amp from the same terminal.

The baseband circuit 560 demodulates the IQ signals based on the modulation method, such as QAM, and outputs an output signal (first output signal), such as a sound or data signal. The receive circuit 510 may include plural receive circuits in accordance with the demodulation method and the frequency band.

The configuration in which the received signal RX2 of a new mode is received and amplified in the communication unit 500 will be discussed below with reference to FIG. 12. As in the case of uplink communication, a circuit corresponding to the IEEE Ku band as an example of the frequency band BAND_A of a new mode and to the IEEE Ka band as an example of the frequency band BAND_B of a new mode is shown. However, the configuration of the communication unit 500 is not restricted to this example. It is assumed that the received signal of the frequency band BAND_A is RX2a, the receive frequency of this received signal is fRX2a=about 15 GHz, the received signal of the frequency band BAND_B is RX2b, and the receive frequency of this received signal is fRX2b=about 28 GHz. A detailed description of the configuration in which the received signal RX1 of a conventional mode is received and amplified will be omitted.

Figure 12:
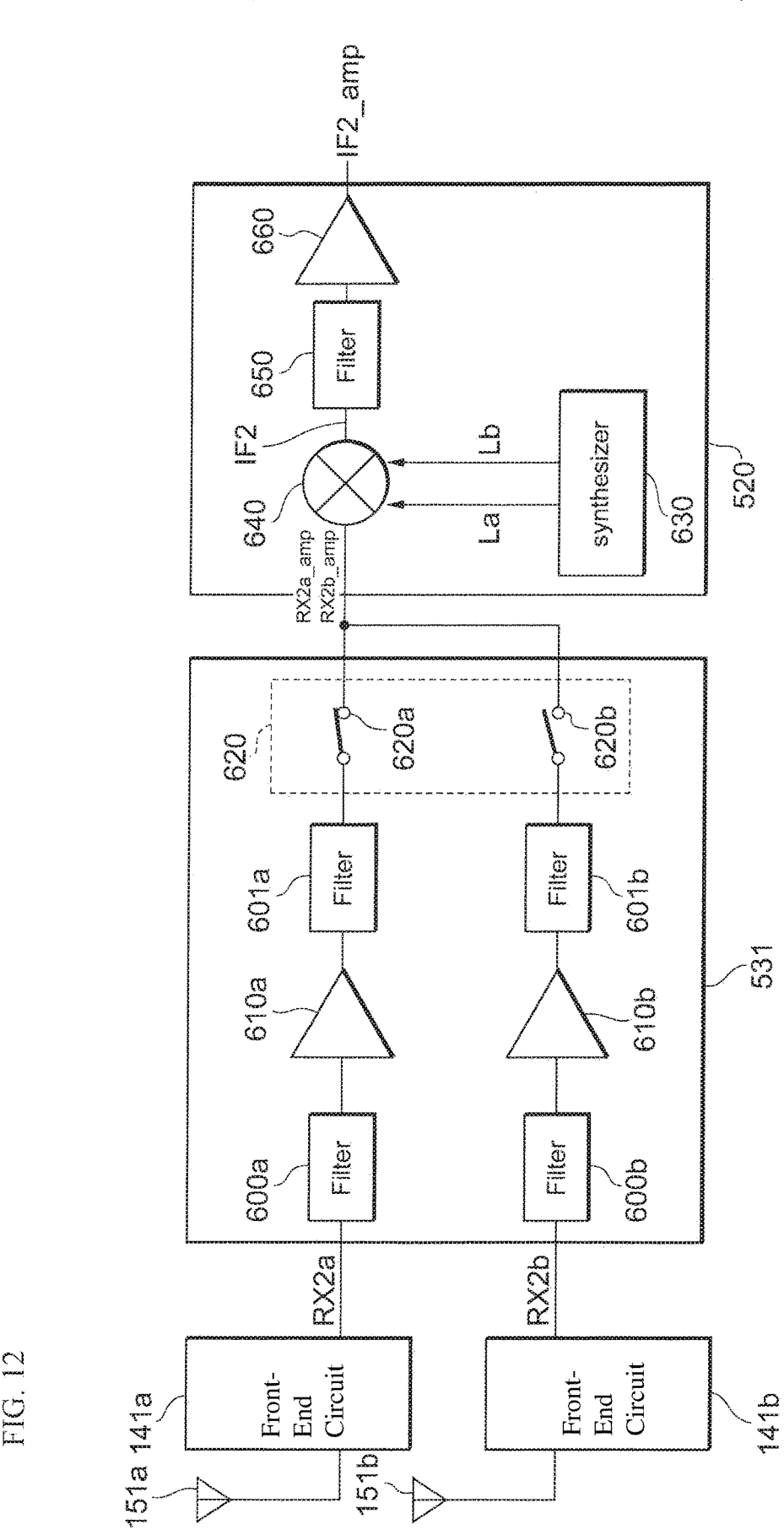
FIG. 12 illustrates examples of the configurations of a signal generating circuit and a low-noise amplifier module.

FIG. 12 illustrates examples of the configurations of the low-noise amplifier module 531 and the signal generating circuit 520.

The low-noise amplifier module 531 amplifies received signals RX2a and RX2b (seventh and ninth signals) respectively output from the front-end circuits 141a and 141b and outputs amplified signals RX2a_amp and RX2b_amp (sixth and seventh amplified signals). The low-noise amplifier module 531 includes filter circuits 600a, 600b, 601a, and 601b, amplifiers 610a and 610b, and a switch circuit 620. In this embodiment, the filter circuits 600a and 601a, the amplifier 610a, and a switch element 620a form an amplification path for the received signal RX2a of the frequency band BAND_A, while the filter circuits 600b and 601b, the amplifier 610b, and a switch element 620b form an amplification path for the received signal RX2b of the frequency band BAND_B. For the sake of simple representation, the other elements forming the low-noise amplifier module 531 (such as a bias circuit and a matching circuit) are not shown in FIG. 12.

The filter circuits 600a and 600b allow the receive frequency components of the received signals RX2a and RX2b to pass through the filter circuits 600a and 600b and attenuate the other frequency components. The filter circuits 600a and 600b may be band pass filter circuits or low pass filter circuits, or may be high pass filter circuits depending on the situation.

The amplifiers 610a and 610b (second and third low-noise amplifiers) respectively amplify the received signals RX2a and RX2b output from the filter circuits 600a and 600b, and respectively output amplified signals RX2a_amp and RX2b_amp (sixth and seventh amplified signals). The amplifiers 610a and 610b may be constituted by MOSFETs or high-electron-mobility transistors (HEMTs) or bipolar transistors, such as HBTs. The amplifiers 610a and 610b may be each constituted by plural stages of amplifiers.

The filter circuits 601a and 601b attenuate harmonics of the amplified signals RX2a_amp and RX2b_amp and noise caused by the amplifiers 610a and 610b. The filter circuits 601a and 601b may be band pass filter circuits or low pass filter circuits, or may be high pass filter circuits depending on the situation.

The switch circuit 620 (fourth switch circuit) supplies only one of the amplified signals RX2a_amp and RX2b_amp in the two frequency bands to the signal generating circuit 520, that is, the switch circuit 620 performs control so that the two amplified signals RX2a_amp and RX2b_amp will not be supplied to the signal generating circuit 520 at the same time. The switch circuit 620 includes the switch elements 620a and 620b. The switch elements 620a and 620b connect or disconnect the low-noise amplifier module 531 to or from the signal generating circuit 520 in the individual amplification paths. When one of the switch elements 620a and 620b is ON, the other one of the switch elements 620a and 620b is OFF. When one of the amplified signals RX2a_amp and RX2b_amp is supplied to the signal generating circuit 520, the other one of the amplified signals RX2a_amp and RX2b_amp is not supplied to the signal generating circuit 520. It is thus less likely that a received signal which may leak from one amplification path will be input into the other amplification path. That is, the isolation between the amplification paths of the received signals RX2a and RX2b can be enhanced.

The signal generating circuit 520 includes a synthesizer 630, a multiplier 640, a filter circuit 650, and an amplifier 660.

In a manner similar to the synthesizer 200 shown in FIG. 2, the synthesizer 630 generates and outputs a local signal La (third reference signal) (frequency fLa=about 10 GHz) and a local signal Lb (fourth reference signal) (frequency fLb=about 23 GHz) for generating the IF signal IF2 from the received signals in the frequency band BAND_A and the frequency band BAND_B.

The multiplier 640 combines the local signal La supplied from the synthesizer 630 and the amplified signal RX2a_amp supplied from the low-noise amplifier module 531 so as to generate the IF signal IF2 (eighth signal), and outputs it. Similarly, the multiplier 640 combines the local signal Lb supplied from the synthesizer 630 and the amplified signal RX2b_amp supplied from the low-noise amplifier module 531 so as to generate the IF signal IF2 (eighth signal), and outputs it.

The IF signal IF2 may be a signal of a frequency (about 5 GHz, for example) which is lower than the frequency (about 15 GHz, for example) of the received signal RX2 (seventh signal) and which can be processed by the receive circuit 510 supporting the conventional modes. It is thus possible to process the received signal RX2 of a new mode by using the receive circuit 510 supporting the conventional modes, without providing an extra receive circuit for a new mode in the communication unit 500.

If the amplified signals RX2a_amp and RX2b_amp are not supplied to the multiplier 640, the synthesizer 630 and the multiplier 640 may be turned OFF so that a local signal and an IF signal will not be generated. The frequencies of the signals generated by the multiplier 640 will be discussed with reference to FIG. 13.

Figure 13:
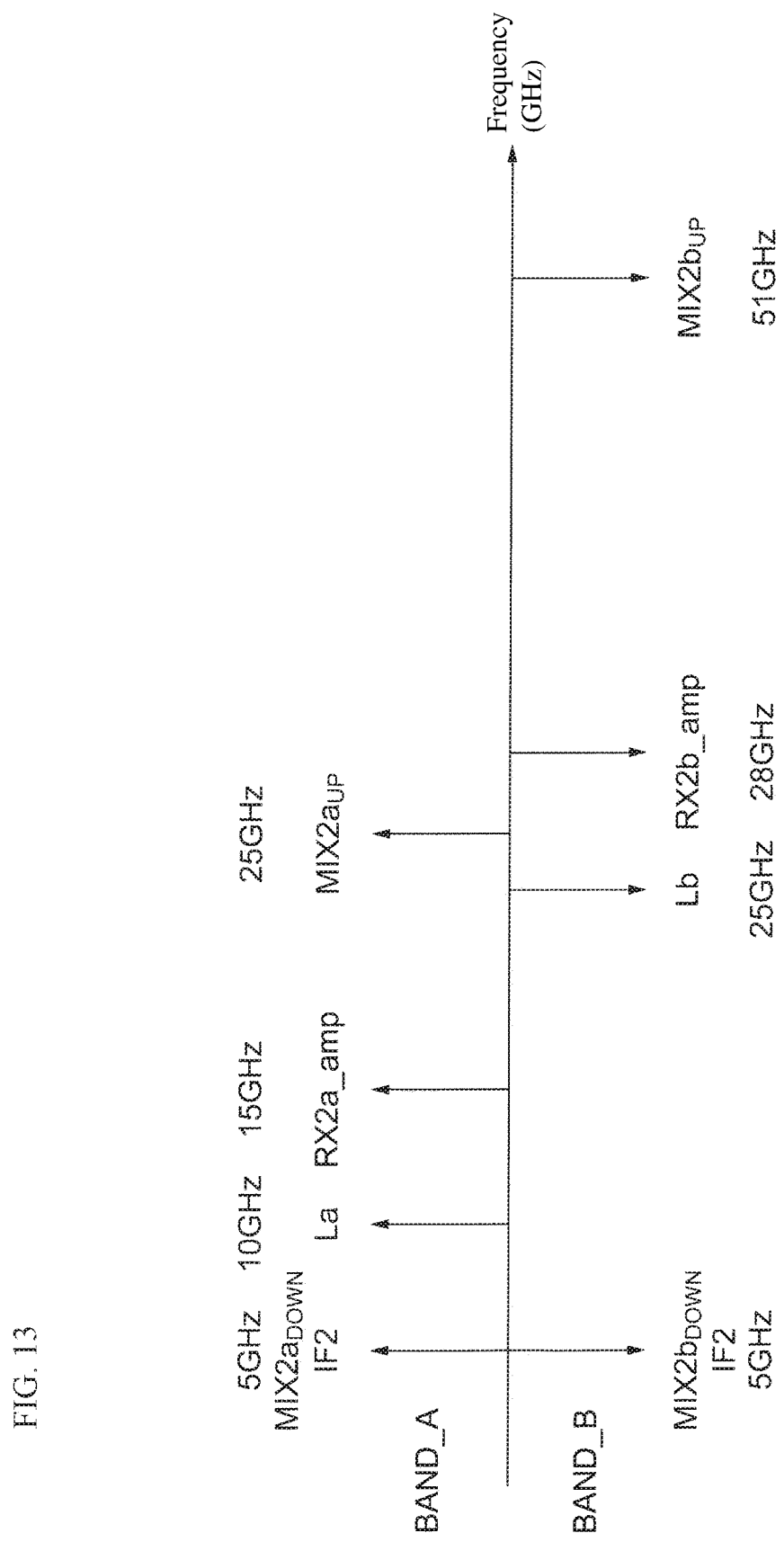
FIG. 13 illustrates an example of a state where an IF signal is generated from amplified signals and local signals.

FIG. 13 illustrates an example of a state where the IF signal IF2 is generated from the amplified signals RX2a_amp and RX2b_amp and the local signals La and Lb. In a manner similar to the multiplier 210 shown in FIG. 2, the multiplier 640 outputs a signal of a frequency representing the sum of the frequencies of two signals and also outputs a signal of a frequency representing the difference between the frequencies of the two signals. That is, if the amplified signal RX2a_amp and the local signal La (frequency fLa=about 10 GHz) are input into the multiplier 640, the multiplier 640 outputs signals including a signal $MIX2a_{UP}$ having a frequency fRX2a+fLa=15+10=25 GHz and a signal $MIX2a_{DOWN}$ having a frequency fRX2a−fLa=15−10=5 GHz. In this embodiment, the signal $MIX2a_{DOWN}$ of about 5 GHz is used as the IF signal IF2, and the signal $MIX2a_{UP}$ of about 25 GHz is an image signal.

Similarly, if the amplified signal RX2b_amp and the local signal Lb (frequency fLb=about 23 GHz) are input into the multiplier 640, the multiplier 640 outputs signals including a signal $MIX2b_{UP}$ having a frequency fRX2b+fLb=28+23=51 GHz and a signal $MIX2b_{DOWN}$ having a frequency fRX2b−fLb=28−23=5 GHz. In this embodiment, the signal $MIX2b_{DOWN}$ of about 5 GHz is used as the IF signal IF2, and the signal $MIX2b_{UP}$ of about 51 GHz is an image signal.

Referring back to FIG. 12, the filter circuit 650 (third filter circuit) attenuates the above-described image signals $MIX2a_{UP}$ and $MIX2b_{UP}$. More specifically, among the signals generated by the multiplier 640, the filter circuit 650 allows the frequency components of the signals $MIX2a_{DOWN}$ and $MIX2b_{DOWN}$ to pass through the filter circuit 650 and attenuates the frequency components of the signals $MIX2a_{UP}$ and $MIX2b_{UP}$. For example, the filter circuit 650 may be a band pass filter circuit or a low pass filter circuit that allows the frequency components of the signals MIX2$a_{DOWN}$ and MIX2$b_{DOWN}$ (about 5 GHz) to pass through the filter circuit 650 and that attenuates the frequency components of the signals MIX2$a_{UP}$ (about 25 GHz) and MIX2$b_{UP}$ (about 51 GHz) which are higher than the signals MIX2$a_{DOWN}$ and MIX2$b_{DOWN}$ (about 5 GHz) (see FIG. 13).

The amplifier 660 (fourth low-noise amplifier) is disposed subsequent to the filter circuit 650. The amplifier 660 amplifies the IF signal IF2 output from the filter circuit 650 and outputs an amplified signal IF2_amp (eighth amplified signal). The amplifier 660 amplifies power of the IF signal IF2 attenuated by the insertion of the filter circuit 650.

The amplified signal IF2_amp output from the signal generating circuit 520 is demodulated by the receive circuit 510.

With the above-described configuration, as in the generation of a transmit signal in the communication unit 100, the communication unit 500 does not have to directly demodulate a received signal in a frequency band of a new mode, but demodulates the amplified signal IF2_amp generated by the signal generating circuit 520. By using the receive circuit 510 supporting conventional modes, the communication unit 500 is able to support a new communication standard (new mode) substantially without the need of additional components.

Figure 14:
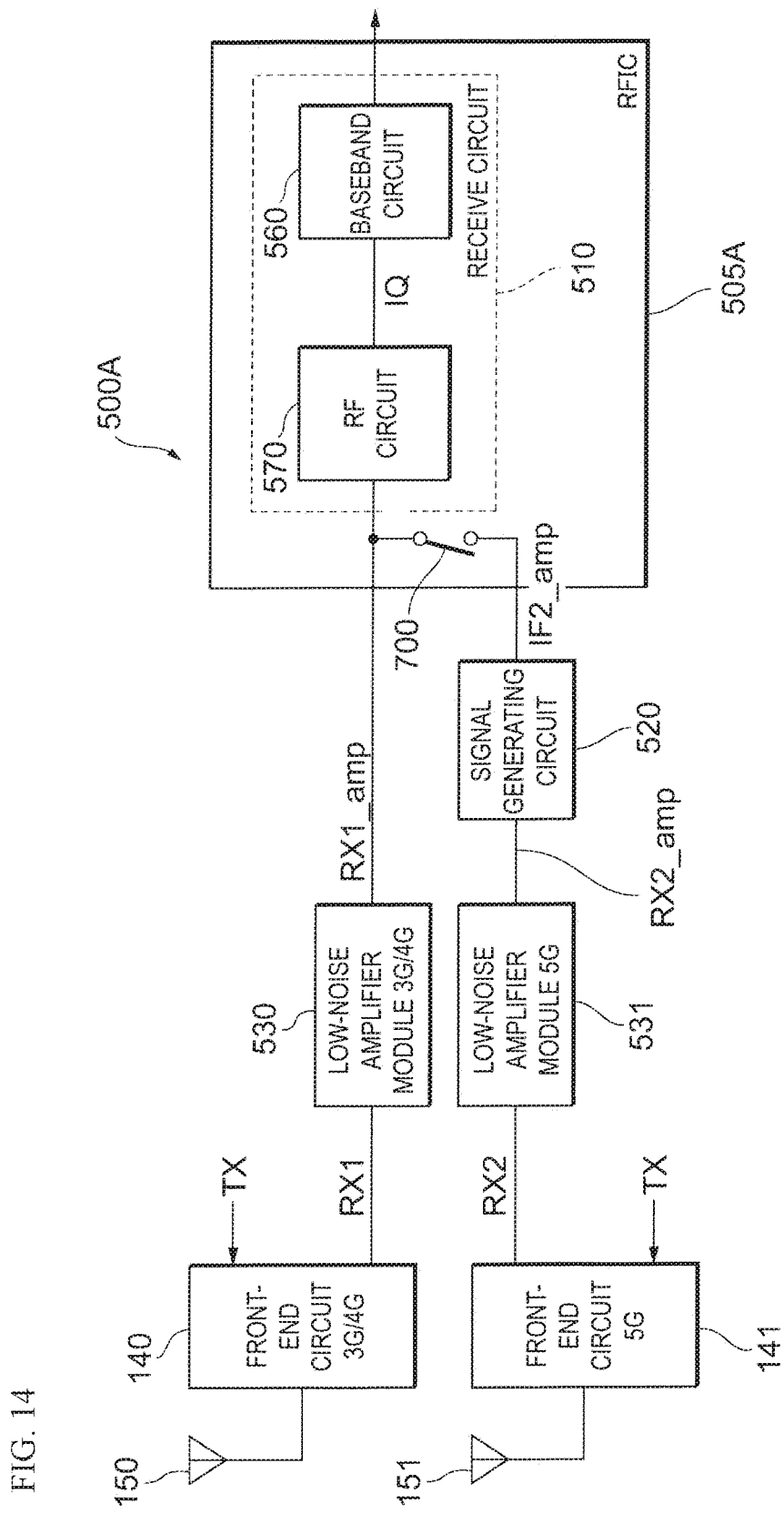
FIG. 14 illustrates another example of the configuration of the communication unit shown in FIG. 11.

FIG. 14 illustrates another example of the configuration of the communication unit 500 (communication unit 500A) according to the embodiment. The communication unit 500A is different from the communication unit 500 shown in FIG. 11 in that it includes a switch element 700 in addition to the elements forming the communication unit 500.

The switch element 700 (third switch circuit) is disposed between the receive circuit 510 and the signal generating circuit 520, and connects or disconnects the receive circuit 510 to or from the signal generating circuit 520. More specifically, the switch element 700 is turned ON when the communication unit 500A receives a received signal in a frequency band of a new mode, and the switch element 700 is turned OFF when the communication unit 500A does not receive a received signal in a frequency band of a new mode. It is thus less likely that, when processing a received signal of a conventional mode and that of a new mode, a received signal of one mode will be input into the path of a received signal of the other mode. The switch element 700 may be disposed within a RFIC 505A, as shown in FIG. 14, or may be disposed outside the RFIC 505A.

Figure 15:
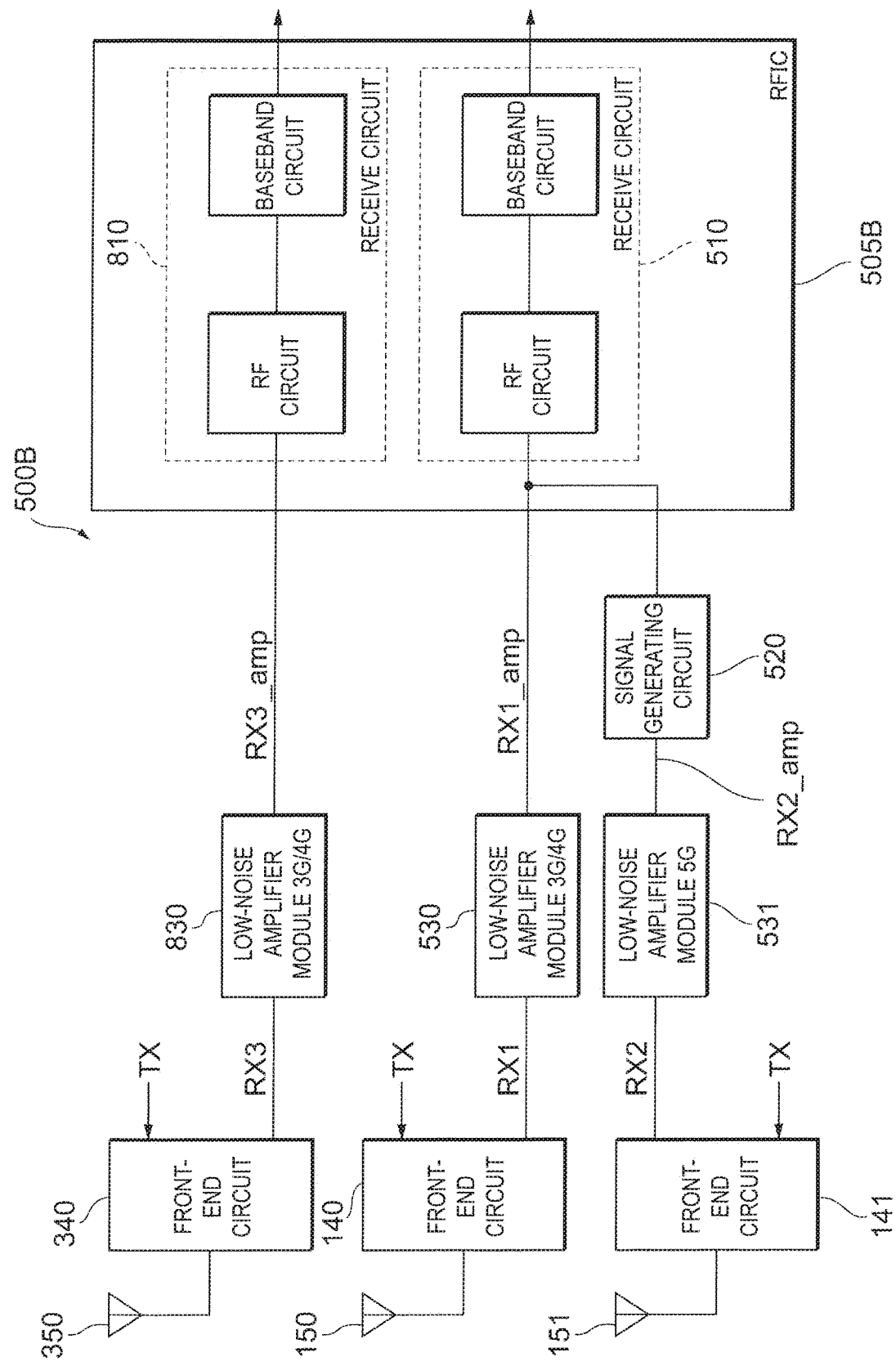
FIG. 15 illustrates another example of the configuration of the communication unit shown in FIG. 11.

FIG. 15 illustrates another example of the configuration of the communication unit 500 (communication unit 500B) according to the embodiment. The communication unit 500B is different from the communication unit 500 shown in FIG. 11 in that it includes a receive circuit 810, a low-noise amplifier module 830, a front-end circuit 340, and an antenna 350 corresponding to a received signal RX3 in a frequency band of a conventional mode, in addition to the elements forming the communication unit 500.

The low-noise amplifier module 830 includes an amplifier (fifth low-noise amplifier). The low-noise amplifier module 830 amplifies the received signal RX3 (tenth signal) in a frequency band of a conventional mode received from the antenna 350 and outputs an amplified signal RX3_amp (ninth amplified signal).

The receive circuit 810 (second receive circuit) demodulates the amplified signal RX3_amp and outputs an output signal (second output signal), such as a sound or data signal.

The detailed configurations of the receive circuit 810, the low-noise amplifier module 830, the front-end circuit 340, and the antenna 350 are similar to those of the receive circuit 510, the low-noise amplifier module 530, the front-end circuit 140, and the antenna 150 shown in FIG. 11, and a detailed explanation thereof will be omitted.

With this configuration, too, by using the receive circuits 510 and 810 supporting conventional modes, the communication unit 500B is able to support a new communication standard (new mode) substantially without the need of additional components. The communication unit 500B, which is capable of simultaneously receiving signals of multiple frequency bands, is applicable to a mobile terminal supporting carrier aggregation, for example. The switch element 700 shown in FIG. 14 may also be used in the communication unit 500B. As shown in FIG. 15, the receive circuits 510 and 810 may be included in a single RFIC 505B. Alternatively, the communication unit 500B may include plural RFICs, and the RFICs may include the respective receive circuits 510 and 810.

Figure 16:
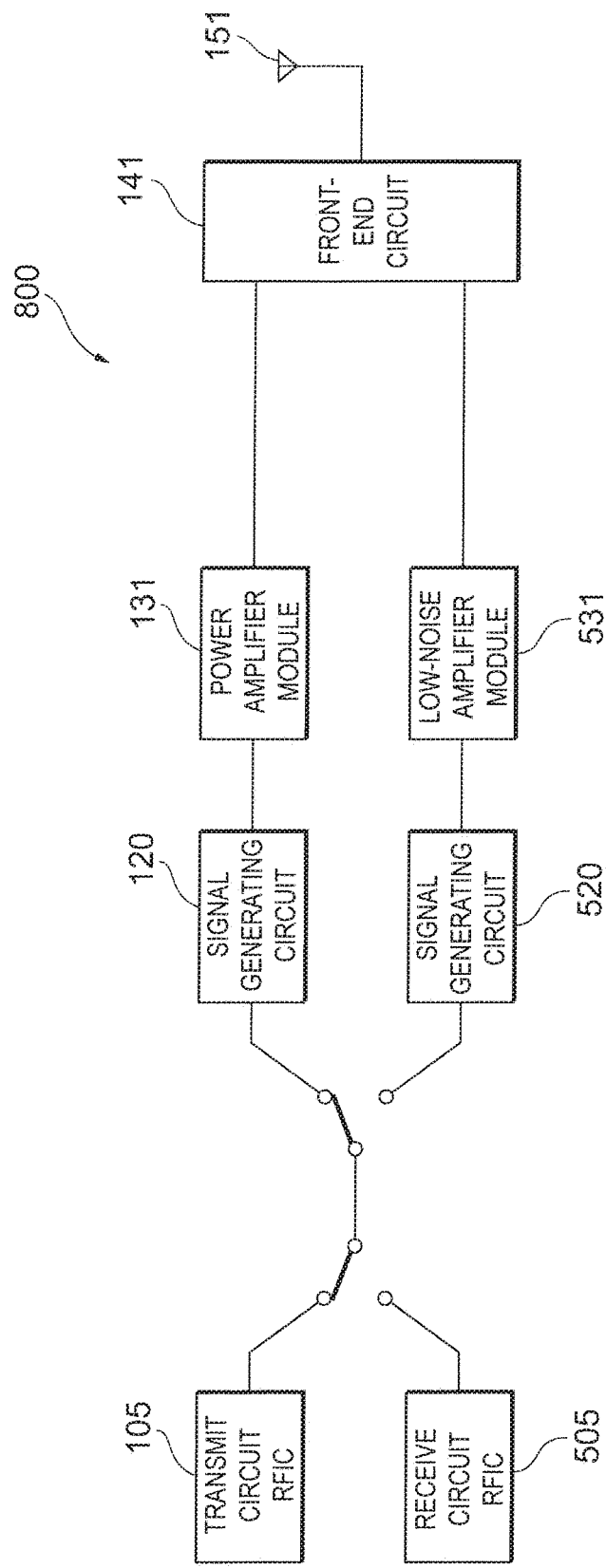
FIG. 16 illustrates an example of the configuration of another communication unit according to an embodiment of the disclosure.

FIG. 16 illustrates an example of the configuration of a communication unit 800 according to an embodiment of the disclosure. As shown in FIG. 16, in the communication unit 800, a front-end circuit 141 switches between a path for a transmit signal and a path for a received signal. The front-end circuit 141 includes a switch circuit, for example, and supplies a transmit signal output from a power amplifier module 131 to an antenna 151 or supplies a received signal output from the antenna 151 to a low-noise amplifier module 531. A path for a signal output from a RFIC 105 including a transmit circuit and a path for a signal output from a RFIC 505 including a receive circuit may also be switched by a switch. For the sake of simple representation, only the path for a new mode is shown in FIG. 16. However, the configuration of the communication unit 800 is not restricted to this example. Although the single antenna 151 is shown, the power amplifier module 131 and the low-noise amplifier module 531 may be connected to different antennas.

Figure 17:
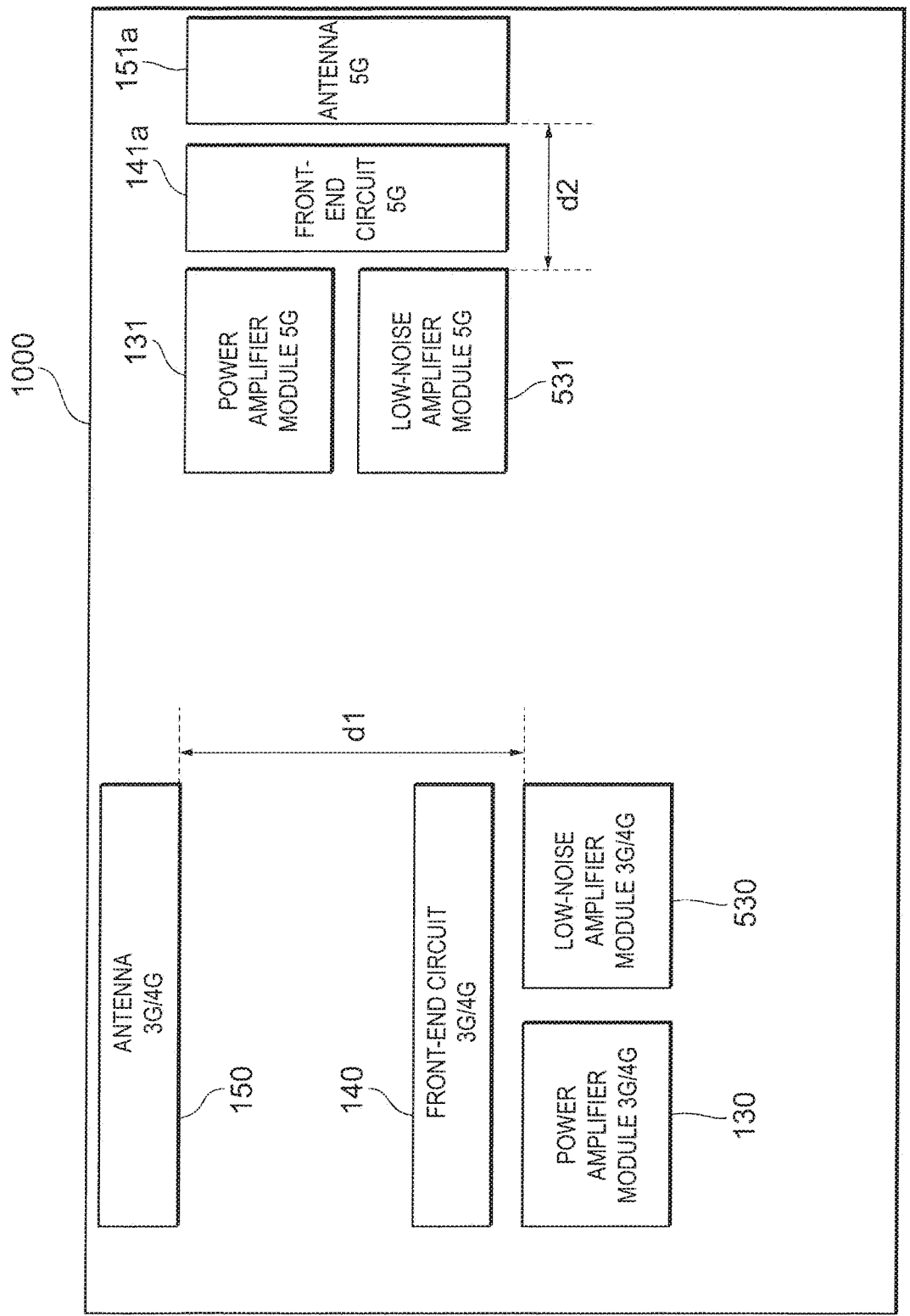
FIG. 17 schematically illustrates an example of the circuit arrangement on a communication device substrate on which a communication unit of an embodiment is mounted.

FIG. 17 schematically illustrates an example of the circuit arrangement on a communication device substrate 1000 on which a communication unit of an embodiment of the disclosure is mounted. The communication device substrate 1000 shown in FIG. 17 has a communication unit of an embodiment mounted thereon, and transmits and receives RF signals with a base station.

As shown in FIG. 17, the communication device substrate 1000 includes antennas 150 and 151a, front-end circuits 140 and 141a, power amplifier modules 130 and 131, and low-noise amplifier modules 530 and 531. For the sake of simple representation, the other components forming the communication device substrate 1000 are not shown in FIG. 17.

On the communication device substrate 1000, the distance of a transmission line from the input/output terminal of the antenna 150 (first antenna) that transmits and receives signals of conventional modes to the output terminal of the amplifier (first amplifier) included in the power amplifier module 130 or to the input terminal of the amplifier (first low-noise amplifier) included in the low-noise amplifier module 530 is set to be d1. On the communication device substrate 1000, the distance of a transmission line from the input/output terminal of the antenna 151a (second antenna) that transmits and receives signals of a new mode to the output terminal of the amplifier (second amplifier) included in the power amplifier module 131 or to the input terminal of the amplifier (second low-noise amplifier) included in the low-noise amplifier module 531 is set to be d2.

The frequency of a RF signal in a frequency band of a new mode is higher than that in a frequency band of a conventional mode, and insertion loss of the RF signal of a new mode is greater than that in a conventional mode. The antenna 151a, the power amplifier module 131, and the low-noise amplifier module 531 are arranged on the communication device substrate 1000 so that the distance d2 of the transmission line between the antenna 151a and the amplifier that amplifies a signal of a new mode will be shorter than the distance d1 of the transmission line between the antenna 150 and the amplifier that amplifies a signal of a conventional mode. It is thus possible to reduce loss of RF signals in the transmission line from the power amplifier module 131 to the antenna 151a via the front-end circuit 141a or the transmission line from the antenna 151a to the low-noise amplifier module 531 via the front-end circuit 141a.

The exemplary embodiments of the disclosure have been discussed. In the communication units 100 and 100A through 100D, the transmit circuits 110 and 110A generate the IF signal IF1, and the signal generating circuits 120, 120A, and 120B generate the high-frequency transmit signals TX2a and TX2b based on the IF signal IF1 and the local signals La through Le. This eliminates the need for the transmit circuits 110 and 110A to directly generate high-frequency transmit signals of a new mode. By using the transmit circuits 110 and 110A supporting conventional modes, the communication units 100 and 100A through 100D are able to support a new communication standard (new mode) substantially without the need of additional components.

In the communication units 100 and 100A through 100E, the transmit circuits 110, 110A, and 410 may output the transmit signal TX1 or the IF signal IF1 from the same terminal. However, the configuration of the signal output terminal is not limited to this example.

The communication unit 100A includes the switch element 300 disposed between the transmit circuit 110 and the signal generating circuit 120. It is thus less likely that, when processing a transmit signal of a conventional mode and that of a new mode, a transmit signal of one mode will be input into the path of a transmit signal of the other mode.

The conventional modes supported by the communication units 100 and 100A through 100E may be modes using frequencies in the IEEE C band (about 4 to 8 GHz band) or lower bands, and a new mode supported by the communication units 100 and 100A through 100E may be a mode using frequencies in the IEEE X band (about 8 to 12 GHz band) or higher bands.

In the communication units 100 and 100A through 100E, the power amplifier module 131 includes the amplifiers 240a and 240b so as to form plural amplification paths for transmit signals in multiple frequency bands of a new mode. This enables the communication units 100 and 100A through 100E to support transmit signals in multiple frequency bands of a new mode.

In the communication units 100 and 100A through 100E, the power amplifier module 131 includes the switch circuit 220 which stops one amplification path when the other amplification path is operated. It is thus less likely that a transmit signal which may leak from one amplification path will be input into the other amplification path. That is, the isolation between the amplification paths can be enhanced.

The communication unit 100B includes the transmit circuit 310, the power amplifier module 330, the front-end circuit 340, and the antenna 350 corresponding to a conventional mode, in addition to the elements forming the communication unit 100. The communication unit 100B is thus able to simultaneously transmit signals of multiple frequency bands, and is applicable to carrier aggregation.

The signal generating circuit 120C includes an image rejection mixer that generates frequency components representing the sum of the frequencies of the IF signal IF1 and the local signal Lf and rejects frequency components representing the difference therebetween. The signal generating circuit 120C is thus able to reduce the influence of noise caused by the image signal to a smaller level than the signal generating circuit 120B.

In the communication unit 100E, the RF circuit 170B supporting a wireless LAN generates the IF signal IF1. With this configuration, too, by using the transmit circuit 410 supporting a wireless LAN, the communication unit 100E is able to support a new communication standard (new mode) substantially without the need of additional components.

In the communication units 500, 500A, and 500B, the signal generating circuit 520 generates the IF signal IF2 based on the amplified signals RX2a_amp and RX2b_amp and the local signals La and Lb. This eliminates the need for the receive circuit 510 to directly demodulate a high-frequency receive signal of a new mode. By using the receive circuit 510 supporting conventional modes, the communication units 500, 510A, and 510B are able to support a new communication standard (new mode) substantially without the need of additional components.

In the communication units 500, 500A, and 500B, the receive circuit 510 may receive the amplified signal RX1_amp or the amplified signal IF2_amp from the same terminal. However, the configuration of the signal input terminal is not limited to this example.

The communication unit 500A includes the switch element 700 disposed between the receive circuit 510 and the signal generating circuit 520. It is thus less likely that, when processing a received signal of a conventional mode and that of a new mode, a received signal of one mode will be input into the path of a received signal of the other mode.

The conventional modes supported by the communication units 500, 500A, and 500B may be modes using frequencies in the IEEE C band (about 4 to 8 GHz band) or lower bands, and a new mode supported by the communication units 500, 500A, and 500B may be a mode using frequencies in the IEEE X band (about 8 to 12 GHz band) or higher bands.

In the communication units 500, 500A, and 500B, the low-noise amplifier module 531 includes the amplifiers 610a and 610b so as to form plural amplification paths for received signals in multiple frequency bands of a new mode. This enables the communication units 500, 500A, and 500B to support received signals in multiple frequency bands of a new mode.

In the communication units 500, 500A, and 500B, the low-noise amplifier module 531 includes the switch circuit 620 which stops one amplification path when the other amplification path is operated. It is thus less likely that a received signal which may leak from one amplification path will be input into the other amplification path. That is, the isolation between the amplification paths can be enhanced.

In the communication units 500, 500A, and 500B, the signal generating circuit 520 includes the amplifier 660 disposed subsequent to the filter circuit 650. The amplifier 660 can amplify power of the IF signal IF2 attenuated by the insertion of the filter circuit 650.

The communication unit 500B includes the receive circuit 810, the low-noise amplifier module 830, the front-end circuit 340, and the antenna 350 corresponding to a conventional mode, in addition to the elements forming the communication unit 500. The communication unit 500B is thus able to simultaneously receive signals of multiple frequency bands, and is applicable to carrier aggregation.

The antenna 151a, the power amplifier module 131, and the low-noise amplifier module 531 are arranged on the communication device substrate 1000 so that the distance of a transmission line between the antenna 151a and the amplifier that amplifies a signal of a new mode will be shorter than the distance of a transmission line between the antenna 150 and the amplifier that amplifies a signal of a conventional mode. It is thus possible to reduce loss of high-frequency RF signals in the transmission lines when transmitting and receiving the high-frequency RF signals.

The above-described embodiments are provided for facilitating the understanding of the invention, but are not intended to be exhaustive or to limit the invention to the precise forms disclosed. Modifications and/or improvements may be made without departing from the scope and spirit of the invention, and equivalents of the invention are also encompassed in the invention. That is, suitable design changes made to the embodiments by those skilled in the art are also encompassed in the invention within the scope and spirit of the invention. For example, the elements of the embodiments and the positions, materials, conditions, configurations, and sizes thereof are not restricted to those described in the embodiments and may be changed in an appropriate manner. The elements of the embodiments may be combined within a technically possible range, and configurations obtained by combining the elements of the embodiments are also encompassed in the invention within the scope and spirit of the invention.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A communication unit comprising:
   a first low-noise amplifier that receives and amplifies a sixth signal and that outputs a fifth amplified signal, wherein the fifth amplified signal is amplified according to a third generation (3G) or a fourth generation (4G) communication standard;
   a second low-noise amplifier that receives and amplifies a seventh signal and that outputs a sixth amplified signal, wherein the sixth amplified signal is amplified according to a fifth generation (5G) communication standard, the 5G communication standard including at least one frequency band that is higher than all frequency bands of the 3G and 4G communication standards;
   a second signal generating circuit that generates an eighth signal, wherein the eighth signal has a frequency lower than a frequency of the sixth amplified signal, and is based on the sixth amplified signal and a third reference signal;
   a third filter circuit that receives the eighth signal and outputs a filtered eighth signal by:
      passing a frequency component representing a sum of the frequency of the sixth amplified signal and a frequency of the third reference signal, or a frequency component representing a difference between the frequency of the sixth amplified signal and the frequency of the third reference signal, and
      attenuating another of the frequency component representing the sum of the frequency of the sixth amplified signal and the frequency of the third reference signal, or the frequency component representing the difference between the frequency of the sixth amplified signal and the frequency of the third reference signal;
   a first receive circuit that outputs a first output signal based on the fifth amplified signal or the filtered eighth signal output from the third filter circuit;
   a third switch circuit disposed between the first receive circuit and the second signal generating circuit;
   a fifth low-noise amplifier that receives and amplifies a tenth signal and that outputs a ninth amplified signal; and
   a second receive circuit that receives the ninth amplified signal and that outputs a second output signal based on the ninth amplified signal,
   wherein a frequency of the tenth signal is equal to or less than a frequency in a C band, and
   wherein the third switch circuit is turned ON when the eighth signal is output from the second signal generating circuit, and the third switch circuit is turned OFF when the eighth signal is not output from the second signal generating circuit.

2. The communication unit according to claim 1, wherein:
   the frequency of the sixth signal is equal to or less than a frequency in a C band; and
   a frequency of the seventh signal is equal to or greater than a frequency in an X band.

3. The communication unit according to claim 1, further comprising:
   a third low-noise amplifier that receives and amplifies a ninth signal and that outputs a seventh amplified signal, wherein
   the second signal generating circuit generates the eighth signal, wherein the eighth signal has a frequency lower than a frequency of the seventh amplified signal, and is based on the seventh amplified signal and a fourth reference signal, and
   the third filter circuit receives the eighth signal and outputs the filtered eighth signal by:
      passing a frequency component representing a sum of the frequency of the seventh amplified signal and a frequency of the fourth reference signal, or a frequency component representing a difference between the frequency of the seventh amplified signal and the frequency of the fourth reference signal, and
      attenuating another of the frequency component representing the sum of the frequency of the seventh amplified signal and the frequency of the fourth reference signal, or the frequency component representing the difference between the frequency of the seventh amplified signal and the frequency of the fourth reference signal.

4. The communication unit according to claim 3, further comprising:
   a fourth switch circuit that supplies either the sixth amplified signal or the seventh amplified signal to the second signal generating circuit.

5. The communication unit according to claim 3, wherein a frequency of the ninth signal is equal to or greater than a frequency in an X band.

6. The communication unit according to claim 1, further comprising:
   a fourth low-noise amplifier that receives and amplifies the eighth signal and that outputs an eighth amplified signal,
   wherein the first receive circuit outputs the first output signal based on the eighth amplified signal.

7. The communication unit according to claim 1, further comprising:
   a communication device substrate on which the first and second low-noise amplifiers are mounted; and
   a first antenna that receives the sixth signal and a second antenna that receives the seventh signal, wherein the first antenna and the second antenna are mounted on the communication device substrate,
   wherein, on the communication device substrate, a distance of a transmission line between an input terminal of the second low-noise amplifier and an output terminal of the second antenna is shorter than a distance of a transmission line between an input terminal of the first low-noise amplifier and an output terminal of the first antenna.

8. The communication unit according to claim 1, wherein the communication unit supports carrier aggregation.

9. The communication unit according to claim 8, wherein the carrier aggregation supports the 4G communication standard and the 5G communication standard.

10. The communication unit according to claim 9, wherein the carrier aggregation supports both 4G communication standards.

* * * * *